(12) United States Patent
Papp et al.

(10) Patent No.: US 12,373,503 B2
(45) Date of Patent: Jul. 29, 2025

(54) CUE DATA MODEL IMPLEMENTATION FOR ADAPTIVE PRESENTATION OF COLLABORATIVE RECOLLECTIONS OF MEMORIES

(71) Applicants: Arnold Papp, Palo Alto, CA (US); Daniel Papp, Palo Alto, CA (US)

(72) Inventors: Arnold Papp, Palo Alto, CA (US); Daniel Papp, Palo Alto, CA (US)

(73) Assignee: CueBack Technology, Inc., Palo Alto, CA (US)

( * ) Notice: Subject to any disclaimer, the term of this patent is extended or adjusted under 35 U.S.C. 154(b) by 0 days.

(21) Appl. No.: 15/961,432

(22) Filed: Apr. 24, 2018

(65) Prior Publication Data

US 2019/0034536 A1    Jan. 31, 2019

Related U.S. Application Data

(60) Provisional application No. 62/490,401, filed on Apr. 26, 2017.

(51) Int. Cl.
    *G06F 16/9535* (2019.01)
    *G06F 16/435* (2019.01)
    (Continued)

(52) U.S. Cl.
    CPC ........ *G06F 16/9535* (2019.01); *G06F 16/435* (2019.01); *G06F 16/438* (2019.01); *G06F 16/447* (2019.01); *G09B 19/00* (2013.01)

(58) Field of Classification Search
    None
    See application file for complete search history.

(56) References Cited

U.S. PATENT DOCUMENTS 6,131,085 A    10/2000  Rossides
8,103,947 B2    1/2012  Lunt et al.
(Continued)

FOREIGN PATENT DOCUMENTS

AR          111657 A1    8/2019
AU     2018258067 A1   12/2019
(Continued)

OTHER PUBLICATIONS

Encyclopedia Britannica. Definition of "recall". Dec. 23, 2015 snapshot via Archive.org. URL Link: <https://www.britannica.com/topic/recall-memory>. Accessed Mar. 2020. (Year: 2015).*
(Continued)

*Primary Examiner* — Irene Baker
(74) *Attorney, Agent, or Firm* — KOKKA & BACKUS, PC

(57) ABSTRACT

Various embodiments relate generally to data science, data analysis, and computer software and systems to apply psychological science and principles to provide an interface for facilitating memory recall, and, more specifically, to a computing and data storage platform that facilitates recall of one or more memories collaboratively and adapts presentation of the one or more memories. In some examples, a method may include identifying data representing a subset of stimuli, determining a cue as data representing a supplemental stimulus, and adapting a recollection based on the supplemental stimulus.

16 Claims, 19 Drawing Sheets

(51) Int. Cl.
  G06F 16/438 (2019.01)
  G06F 16/44 (2019.01)
  G09B 19/00 (2006.01)

(56) References Cited

U.S. PATENT DOCUMENTS

| | | | |
|---|---|---|---|
| 8,645,485 B1* | 2/2014 | Yadid | H04N 21/25891 |
| | | | 709/203 |
| 8,701,022 B2 | 4/2014 | Sharpe et al. | |
| 8,814,359 B1 | 8/2014 | Pompilio, I et al. | |
| 9,129,008 B1* | 9/2015 | Kuznetsov | G06F 16/24578 |
| 9,286,643 B2 | 3/2016 | Reinders et al. | |
| 2002/0169769 A1 | 11/2002 | Jackson | |
| 2004/0153445 A1 | 8/2004 | Horvitz et al. | |
| 2006/0242139 A1* | 10/2006 | Butterfield | G06F 16/951 |
| 2006/0259954 A1* | 11/2006 | Patrick | G06F 21/62 |
| | | | 726/2 |
| 2007/0081744 A1* | 4/2007 | Gokturk | G06F 16/5854 |
| | | | 382/305 |
| 2007/0234213 A1* | 10/2007 | Krikorian | H04N 21/23406 |
| | | | 715/716 |
| 2007/0250496 A1 | 10/2007 | Halliday et al. | |
| 2007/0250791 A1 | 10/2007 | Halliday et al. | |
| 2009/0070426 A1* | 3/2009 | McCauley | G06Q 10/10 |
| | | | 709/205 |
| 2009/0070684 A1* | 3/2009 | Aldrich | G06Q 10/10 |
| | | | 715/743 |
| 2009/0157672 A1 | 6/2009 | Vemuri | |
| 2009/0216435 A1 | 8/2009 | Zheng et al. | |
| 2009/0248738 A1* | 10/2009 | Martinez | G06F 16/337 |
| 2010/0179915 A1* | 7/2010 | Nastacio | G06Q 30/02 |
| | | | 705/319 |
| 2010/0312596 A1* | 12/2010 | Saffari | G06F 3/0481 |
| | | | 705/7.32 |
| 2011/0225178 A1* | 9/2011 | Ingrassia | G06F 16/48 |
| | | | 707/769 |
| 2013/0031590 A1* | 1/2013 | Ivanov | H04N 21/4126 |
| | | | 725/110 |
| 2013/0061135 A1 | 3/2013 | Reinders et al. | |
| 2013/0117802 A1* | 5/2013 | Fendt | G06F 21/6218 |
| | | | 726/1 |
| 2013/0124560 A1* | 5/2013 | O'Sullivan | G06F 21/6218 |
| | | | 707/769 |
| 2013/0129142 A1* | 5/2013 | Miranda-Steiner | |
| | | | G06K 9/00664 |
| | | | 382/103 |
| 2013/0151346 A1* | 6/2013 | Schoen | G06Q 30/02 |
| | | | 705/14.66 |
| 2013/0297216 A1 | 11/2013 | Hirst et al. | |
| 2013/0310653 A1 | 11/2013 | Zillner et al. | |
| 2014/0181149 A1* | 6/2014 | Ilan | G06Q 50/01 |
| | | | 707/784 |
| 2014/0189539 A1* | 7/2014 | St. Clair | G06Q 50/01 |
| | | | 715/753 |
| 2014/0331264 A1* | 11/2014 | Schneiderman | H04N 21/278 |
| | | | 725/92 |
| 2014/0342326 A1 | 11/2014 | Shih | |
| 2014/0344688 A1* | 11/2014 | Kulick | G06F 16/9537 |
| | | | 715/716 |
| 2015/0120081 A1 | 4/2015 | Forcke et al. | |
| 2015/0156530 A1* | 6/2015 | Cao | H04N 21/4316 |
| | | | 725/34 |
| 2016/0132591 A1* | 5/2016 | Clark | G06F 16/248 |
| | | | 707/723 |
| 2016/0140146 A1* | 5/2016 | Wexler | G06K 9/4604 |
| | | | 707/741 |
| 2016/0283564 A1* | 9/2016 | Sharon | G06F 16/24578 |
| 2017/0236055 A1* | 8/2017 | Lin | G06N 3/08 |
| | | | 706/20 |
| 2018/0052817 A1 | 2/2018 | Bethard et al. | |
| 2018/0150444 A1* | 5/2018 | Kasina | G06F 16/4393 |
| 2019/0200888 A1 | 7/2019 | Poltorak | |

FOREIGN PATENT DOCUMENTS

| | | |
|---|---|---|
| EP | 0495305 B1 | 7/1999 |
| EP | 3616185 A1 | 3/2020 |
| JP | 2021518934 A | 8/2021 |
| JP | 7155248 B2 | 10/2022 |
| JP | 2022191336 A | 12/2022 |
| TW | 201843610 A | 12/2018 |
| WO | 2016094330 A2 | 6/2016 |
| WO | 2018200641 A1 | 11/2018 |
| WO | 2022165372 A1 | 8/2022 |

OTHER PUBLICATIONS

Young, Lee W., International Searching Authority, Notification of Transmittal of the International Search Report and the Written Opinion of the International Searching Authority, or the Declaration for International Patent Application No. PCT/US2018/029308, mailed Sep. 21, 2018.

Baker, Irene H., Final Office Action mailed Mar. 28, 2023 for U.S. Appl. No. 17/164,568.

Baker, Irene, Non-Final Office Action mailed Jul. 11, 2022 for U.S. Appl. No. 17/164,568.

Brown et al., "Automatic Measurement of Propositional Idea Density from Part-of-Speech Tagging," URL: https://www.ncbi.nlm.nih.gov/pmc/articles/PMC2423207/. Retrieved Jun. 29, 2022 (Year: 2008).

Chand et al., "Analysis of Idea Density (AID): A Manual." ResearchGate, Jan. 2012 (2012).

Covington et al., "How Complex is that Sentence? A Proposed Revision of the Rosenberg and Abbeduto D-Level Scale," CASPR Research Report Jan. 2006, Artificial Intelligence Center, The University of Georgia, ResearchGate, Jan. 2006 (Year: 2006).

Fyhr, Jonas, European Patent Office, Extended European Search Report for European Patent Application No. 18792108.5 mailed Dec. 4, 2020.

Rodriquez, Kari, Notification of Transmittal of the International Search Report and the Written Opinion of the International Searching Authority, or the Declaration mailed Jun. 29, 2022 for International Application No. PCT/US2022/014616.

Baker, Irene H., Final Office Action mailed Jul. 26, 2024 for U.S. Appl. No. 17/164,568.

Baker, Irene H., Non-Final Office Action mailed Sep. 28, 2023 for U.S. Appl. No. 17/164,568.

Battista et al., "Optimizing Neuropsychological Assessments for Cognitive, Behavioral, and Functional Impairment Classification: A Machine Learning Study," Behavioral Neurology, vol. 2017. Published Jan. 31, 2017. URL Link : hep://onlinelibrary.wiley.com/doi/10.1155/2017/1850909. Accessed Jul. 2024 (Year: 2017).

Childs et al., "In Situ Processing," Oct 2012. URL Link : https://www.osti.gov/servlets/purl/1170763. Accessed Jul. 2024 (Year: 2012).

Garrard et al., "Machine learning approaches to diagnosis and laterality effects in semantic dementia discourse." Cortex; a journal devoted to the study of the nervous system and behavior, vol. 55 (2014): 122-9. doi: 10.1016/j.cortex.2013.05.008. Accessed Jul. 2024 (Year: 2014).

Merriam-Webster Dictionary. "in situ". Nov. 23, 2016 snapshot via Archive.org. URL link : https://www.merriam-webster.com/dictionary/in%20situ. Accessed Jul. 2024 (Year: 2016).

Weakley et al., "Neuropsychological test selection for cognitive impairment classification: A machine learning approach." Journal of clinical and experimental neuropsychology vol. 37,9 (2015): 899-916. URL link : https://www.ncbi.nlm.nih.gov/pmc/articles/PMC4809360/. Accessed Jul. 2024. (Year: 2015).

Williams et al., "Machine Learning Techniques for Diagnostic Differentiation of Mild Cognitive Impairment and Dementia," Association for the Advancement of Artificial Intelligence 2013. URL Link : https://cdn.aaai.org/ocs/ws/ws1019/7090-30554-1-PB.pdf. Accessed Jul. 2024 (Year: 2013).

\* cited by examiner

FIG. 15

The Beatles are the best-selling band in history, with estimated sales of over 800 million physical and digital albums worldwide. They have had more number-one albums on the British charts and sold more singles in the UK than any other act. } Public 1604

*Alan Williams, the Beatles' unofficial manager, arranged a residency for them in Hamburg, but lacking a full-time drummer they auditioned and hired Pete Best in mid-August 1960. The band, now a five-piece, left four days later, contracted to club owner Bruno Koschmider for what would be a 3½-month residency.* } Football Club Members 1606

<u>Sgt. Pepper was the first major pop/rock LP to include its complete lyrics, which appeared on the back cover. On 25 June 1967, the Beatles performed their forthcoming single, "All You Need Is Love", to an estimated 350 million viewers on Our World, the first live global television link. Released a week later, during the Summer of Love, the song was adopted as a flower power anthem.</u> } Tennis Club Members 1608

Eric 1601a — 1602a

Collaborative Recollection Engine 1650

Adaptive Recollection Processor 1654

Repository 1656

Network 1603

| 1610 | | Eric 1622 | Ringo 1624 | George 1625 | Paul 1626 | John 1628 |
|---|---|---|---|---|---|---|
| 1612 | Public | X | X | X | X | X |
| 1614 | Tennis Club Member | X | X | 1621 | X | 1621 |
| 1616 | Football Club Member | X | 1621 | X | X | 1621 |

Ringo 1601b — 1602b

George 1601c — 1602c

Comment Data 1634

Paul 1601d — 1602d

Comment Data 1636

John 1601e — 1602e

Comment Data 1638

CUE DATA MODEL IMPLEMENTATION FOR ADAPTIVE PRESENTATION OF COLLABORATIVE RECOLLECTIONS OF MEMORIES

CROSS-REFERENCE TO APPLICATIONS

This application is a nonprovisional application that claims the benefit of U.S. Provisional Patent Application No. 62/490,401 filed on Apr. 26, 2017, and titled "ADAPTIVE PRESENTATION OF COLLABORATIVE RECOLLECTIONS OF MEMORIES," which is herein incorporated by reference in its entirety for all purposes.

FIELD

Various embodiments relate generally to data science, data analysis, and computer software and systems to apply psychological science and principles to provide an interface for facilitating memory recall, and, more specifically, to a computing and data storage platform that facilitates recall of one or more memories collaboratively and adapts presentation of the one or more memories.

BACKGROUND

Advances in computing hardware and software have fueled exponential growth in sharing and communicating of personal experiences, whether set forth in text, as a recounting of an experience, or displayed in one or more digital photographs. Conventionally, personal experiences are usually shared via networked computing systems implementing social networking applications, such as Facebook™, regardless of whether a particular social networking system or application relies on text, imagery, audio, etc., or combinations thereof. Currently, subscribers of social networking websites are inundated with various updates to each person's experiences, each of which includes a deluge of information (e.g., text and images) about their personal experiences. In some cases, and depending on the number of "friends of friends" relationships, subscribers of most conventional social networking websites receive information voyeuristically, rather than as a participant.

While traditional social networking applications and computing systems are functional, they are not well-suited to tailor information to a subscriber interested in connecting with a shared experience. Consequently, most users or subscribers are usually bombarded with tens or hundreds of personal experiences that often not relatable to a particular recipient. Therefore, at least some subscribers are exposed to others' lives and memories without a benefit for a subscriber to reminisce or engage others to establish a connection with which to recall a memory.

Moreover, at least some software developers that influence the development of the social networking applications, may have less life experience than other subsets of potential subscribers or users. Hence, the other subsets of subscribers or users likely have little to no opportunity to reminisce or otherwise augment their past memories. For example, a person born during the Baby Boom generation generally is growing older with experiences relating to both pre- and post-digital age technologies. So, while they may have accumulated a lifetime of experiences and wisdom, their experiences and knowledge generally, unlike later generations, may exist as memories or are perhaps most likely instantiated in analog format, such as print photos, film, paper journals and so forth. Accordingly, conventional social networking systems can be an inadequate vehicle with which to convey information for certain users (e.g., certain memories).

For example, a person's experiences and concomitant accumulation of memories generally increases with age. However, due to physical age or other factors (e.g., dementia, stress, etc.), a user may experience a decreasing ability to recollect memories quickly or not at all. Typical conventional social networking systems, however, do not address these limitations in memory recollection.

At least some traditional social networking systems employ a binary content control mechanism with which to convey information. For instance, such systems typically require a user to select an individual, or a group of individuals, any of whom can access the published content on an "all" or "nothing" basis (e.g., an entire post or nothing at all). Hence, persons having a relationship to a user (e.g., child, parent, boss, co-worker, clergy, family, etc.) will receive the same published content. Moreover, depending on whether one is identified as a "friend" (i.e., others are "not a friend"), one may receive personal experiences that are foreign to a user. Therefore, experiences of unknown persons linked through loose associations (e.g., "a friend of a friend of a friend" association) may be displayed to a user who may rather not receive such experiences.

Thus, what is needed is a solution for facilitating techniques to facilitate memory recall, without the limitations of conventional techniques.

BRIEF DESCRIPTION OF THE DRAWINGS

Various embodiments or examples ("examples") of the invention are disclosed in the following detailed description and the accompanying drawings:

FIG. 15 is a diagram depicting a user interface configured to form an adapted recollection, according to some examples;

FIG. 16 is a diagram of an adaptive recollection processor configured to adapt a recollection as a function of permissions by collaborative users to access the recollection, according to some examples;

DETAILED DESCRIPTION

Various embodiments or examples may be implemented in numerous ways, including as a system, a process, an apparatus, a user interface, or a series of program instructions on a computer readable medium such as a computer readable storage medium or a computer network where the program instructions are sent over optical, electronic, or wireless communication links. In general, operations of disclosed processes may be performed in an arbitrary order, unless otherwise provided in the claims.

A detailed description of one or more examples is provided below along with accompanying figures. The detailed description is provided in connection with such examples, but is not limited to any particular example. The scope is limited only by the claims, and numerous alternatives, modifications, and equivalents thereof. Numerous specific details are set forth in the following description in order to provide a thorough understanding. These details are provided for the purpose of example and the described techniques may be practiced according to the claims without some or all of these specific details. For clarity, technical material that is known in the technical fields related to the examples has not been described in detail to avoid unnecessarily obscuring the description.

Figure 1:
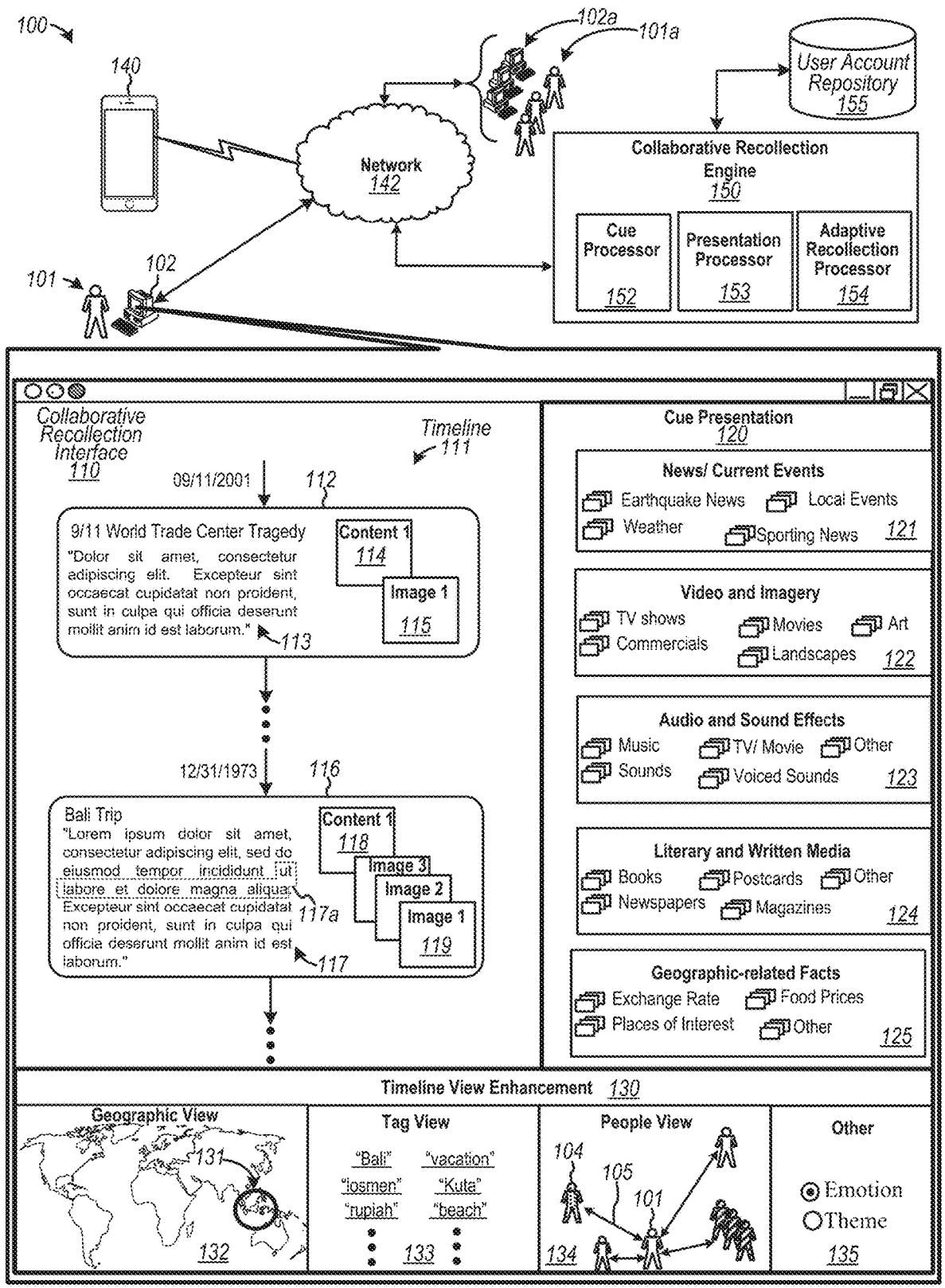
FIG. 1 is a diagram depicting an example of a collaborative recollection engine, according to some embodiments.

FIG. 1 is a diagram depicting an example of a collaborative recollection engine, according to some embodiments. Diagram 100 depicts an example of a collaborative recollection engine 150 configured to facilitate recollection of one or more memories of one or more users. Collaborative recollection engine 150 is configured to generate numerous amounts of sensory stimuli (e.g., visually, such as a website, auditorily, such as music, songs, spoken word, etc., olfactory-related stimuli, such as aromas, etc.) to facilitate a user's recollection of a memory. As shown, a user 101 may access computing device 102 to interact via a network 142 with collaborative recollection engine 150.

Collaborative recollection engine 150 may be configured to implement functions configured to apply psychological techniques, which may be adapted in accordance with various functions and/or structures described herein, to evoke memory recall. Various functions and structures described herein may be configured to assist, for example, accessing memory (e.g., episodic memory), whereby memories associated with encoded senses, such as sight, sound, smell, touch, taste, etc., may be readily accessible or relatable to a specific recollection of one or more instances of memories, or representations of a memory itself. An instance of memory, for example, may refer to recollection of a past experience associated with one of a number of encoded senses (e.g., a unit of memory), such as an aroma from baking "mom's" chocolate chip cookies. One or more instances of memory may be combined to constitute an episodic memory, such as a sequence of past experiences (e.g., memory of performing an activity, such as snorkeling, during a past vacation to Hawaii). The one or more instances of memory may also be combined to form or elicit a "flashbulb memory," whereby the recollection of memory is clear and detailed in multiple ways (e.g., who was present, what olfactory senses are recalled, visual and auditory memories, such as sights and sounds of weather associated with the recollection, an emotion that a person had during the experience, etc.). Episodic memories (e.g., personal experiences and specific objects, people and events experienced at a particular time and place) and semantic memory (e.g., general knowledge about facts) may combine to constitute autobiographical memory. While memories, such as episodic memories, may be consciously or explicitly recalled, some memories may be recalled subconsciously or responsively, for example, to one or more memory cues. Accordingly, collaborative recollection engine 150 may be configured to generate stimuli that may supplement, refresh, and/or reconstitute one or more memories based on one or more memory cues or the like.

Collaborative recollection engine 150 may be configured to facilitate memorialization or archival of a user's experiences, with optional authorized access provided to other users to view, supplement, modify or otherwise enhance a user's recollection of its experiences. As shown, collaborative recollection engine 150 may accept input via network 142 from computing device 102 to form and relate data representing user's 101 past experiences (and associated characteristics thereof). Therefore, user 101 may be able to memorialize its memories as data configured for presentation or display in a timeline 111. Diagram 100 depicts the stored and interrelated past experiences of user 101 being presented as timeline 111, which presents recollective memories of user 101. Timeline 111 is shown, in this example, to include a display of a recollection 112 describing the various facets of a past experience entitled "9/11 World Trade Center Tragedy" and a recollection 116 describing the various aspects of another past experience entitled "Bali Trip." Recollections 112 and 116 relate to dates Sep. 11, 2001, and Dec. 31, 1973, respectively. In this example, recollection 112 may include a textual description 113 of a perspective and past experience of user 101 of the terrorist-related tragedies relating to Sep. 11, 2001. Similarly, recollection 116 may include another textual description 117 describing user's 101 past vacation experience in Bali.

Recollections 112 and 116 may be supplemented by additional sources of stimuli provided by user 101 or any of users 101a, such as images 115 and 119 (e.g., digital photographs, or the like) and other content 114 and 118 (e.g., videos, sounds, music, etc.) that also may be provided by user 101 or any of users 101a. The system itself may also supplement a recollection with additional sources of stimuli, such as images or other content in accordance to some examples. Images 115 and 119 and content 114 and 118 may assist user 101 (or any user 101a) to recollect additional subject matter relating to recollections 112 and 116. For example, a photo 119 associated with recollection 116 may elicit additional information from one of users 101a, which may be added as text 117a to include or form supplemental recollection text 117. For example, text 117a may include information that evokes a portion of a memory for user 101 that otherwise may have been forgotten by user 101. Therefore, collaborative recollection engine 150 may be configured to enrich recollection 116 collaboratively, so as to enable user 101 and users 101a to collaborate to bolster user's 101 recollection of its past experiences. According to some embodiments, user 101 and each of users 101a may be associated with user account identifiers that uniquely identify each of the users and may store data for facilitating one or more functionalities described or otherwise performed by collaborative recollection engine 150. As shown, user account repository 155 may store data representing user account information for each specific user 101 and users 101a. As such, user 101 may identify user account identifiers (e.g., directly or indirectly) to grant access privileges to view one of recollections 112 or 116, or both. Thus, some users 101a may not have access to recollections 112 and 116 to preserve privacy.

Note that in some cases, the term "collaborative" may include any data originating from one or more users 101 and 101a, as well as any related content (e.g., additional or modified text, images, audio, content, etc.), and the system (e.g., additional or modified text, images, audio, content, etc.) that may facilitate aggregation of encoded sensory stimuli (e.g., units of memory) to form data representing a recollection, which may form or be recollected as an episodic memory, autobiographical memory, etc. Further, "collaborative" may refer to data representing a resultant collaborative memory recollection based on conscious or unconscious recollections of constitute memories based on autobiographical memory of user 101 and based on memory recollections of one or more other users 101a. In some cases, collaborative recollection engine 150 may be configured to supplement recollections 112 and 116 by implementing or presenting media (e.g., photos 115, 119, and other content 114, 118 as constituent elements of a recollection) to one who may have a memory triggered in response to viewing or perceiving such images and content as cues. According to some examples, a cue may be implemented or formed as data representing a sensory stimulus configured to, for instance, evoke a memory recollection. Note, however, presentation of images 115, 119 and other content 114, 118 may be optional, and timeline 111 need not be reliant on them, at least in some examples. The media may include images (e.g., stock or system-provided images) or any other media content or stimuli, which can be identified by cue processor 153 based on, for example, metadata, keywords, or other attributes that may be associated to content with which to elicit a memory. In some examples, cue processor 153 may be configured to enrich content, such that content enrichment can provide for a direct or indirect cue to trigger additional recollection(s).

User 101 may be considered as a primary user in view of a specific set of recollections, whereby user 101 may be a person that is interested in memorializing certain past experiences to, for example, supplement or enrich those experiences based on other memories, regardless whether the other memories may be memorialized as data provided by user 101 or other users 101a, or any other source of stimuli. Thus, collaborative recollection engine 150 may be configured to receive recollective data via collaborative recollection interface 110 at computing device 102 via user 101. The "other" memories may be derived subconsciously via a memory cue for user 101. The "other" memories may be derived from, or enriched by, one or more other users 101a via one or more computing devices 102a, whereby any of users 101a may share a common experience with user 101. In some examples, collaborative recollection engine 150 may also exchange data via computing devices 102a from other users 101a, at least some of whom may have a direct or indirect interpersonal relationship (e.g., as a parent, a child, a friend, an employer, an employee, a mentor, etc.) with user 101. In some examples, user 101 may generate data representing such an interpersonal relationship as a function, for example, a type of relationship, a range of time (e.g., one or more dates), geographic location, type of event, emotion, etc. so that collaborative recollection engine 150 may be assisted in generating memory cues at memory cue processor 152 as well as adapted recollections at adaptive recollection processor 154.

Note, however, an interpersonal relationship need not exist between user 101 and any of other users 101a, and knowledge of each other need not exist to facilitate collaboration in forming a recollection 112 or 116 in accordance with one or more perspectives of a particular experience or memory. According to some examples, collaborative recollection engine 150 may be configured to identify subsets of users 101 and 101a that may have one or more similar user attributes (e.g., similar age range, similar interests, similar occupations, similar vacation destinations, similar college experiences, etc.), and may further be configured to identify unknown (e.g., personally unknown) users 101a and 101 to each other to share similar recollections or memories, or to provide each other with references to media content (e.g., images, text, audio, etc., whereby a "unit of content" may refer to a portion of content, such as an image, a portion or paragraph of text, a song or sound, etc.) that may unconsciously may trigger a memory by a user that otherwise might be forgotten.

According to some examples, collaborative recollection engine 150 may be configured to filter which users 101a may access collaborative recollection interface 110 for user 101, and may further restrict various levels of information that any particular user 101a may access (e.g., via redaction, text modification, image modification, and the like). For example, collaborative recollection engine 150 may be configured to enable user 101 (as well as users 101a) to grant different levels of permissive access to specific users or categories of users. For example, user 101 (via computing device 102) may grant access (e.g., viewing access) to any number of users 101a. Note that "access" may be granted to expose any of users 101 and 101a to other stimuli (e.g., sound, smell, touch, such as haptic access, etc.), any of which may be used as a shared recollection or a cue (e.g., a stimulus that elicits a memory of a recipient user). Users 101 and 101a can also alter access rights (e.g., viewing rights) within a single memory or recollection. For example, user 101 may permit a subset of users 101a to access recollection 116 for supplementing or modification, such as adding a memory (or portion thereof) that is depicted as added text 117a to enrich recollection text 117. For example, user 101 may grant a subset of users 101*a* access to view and/or modify textual description 117 (or to suggest modifications to textual description 117). The subset of users 101*a* may include users (e.g., friends or family members) that accompanied user 101 to Bali in December 1973. Alternatively, a subset of users 101*a* may include other users 101*a* (even if unknown to user 101) that had visited Bali at or within a time range including Dec. 31, 1973. For example, another user 101*a*, while unknown to user 101, may reminisce about an event (e.g., a surfing contest at Kuta Beach, or an earthquake, or some other localized event) occurring around that same time. Such events may cause user 101 to retrieve seemingly forgotten memories or be utilized to enrich user 101's own memories by confirming one's recollection or providing details.

Collaborative recollection engine 150 is shown in this example to include a cue processor 152, a presentation processor 153, and an adaptive recollection processor 154, one or more of which may be implemented to cause generation of a collaborative recollection interface 110 at, for example, a computing device 102 associated with a user 101. Cue processor 152 may be configured to determine one or more memory cues (or memory triggers) that may be configured to trigger recollection of a memory, regardless of whether the memory is recalled consciously, subconsciously, involuntarily, etc., or regardless of whether the memory is based on olfactory recollective memories (e.g., a scent of a spring morning after rainfall), visual recollective memories (e.g., a vivid recollection of a turquoise ocean near white sandy beaches of a Caribbean island), auditory recollective memories (e.g., a certain song or musical score), tactile or haptic recollective memories, etc. Types of memory cues may include data representing notable events, music, and popular cultural phenomenon, such as television ("TV") shows and soundtracks, movies and corresponding soundtracks, commercials (e.g., TV, radio, etc.), sporting events, news events and stories, Internet-related events (e.g., memes), etc., or any other information likely to elicit or otherwise bolster a memory.

Cue processor 152 may be configured to generate cues independent of a user's actions (i.e., independent of user 101 or users 101*a*), and, as such, user 101 need not have to explicitly request for a cue to be created. For example, cue processor 152 may identify one or more attributes of user 101 (e.g., based on demographic data, including age, gender, etc., as well as associated family member identities and attributes, friend identities and attributes, as well as interests, such as sports, geographic locations to which user 101 has traveled, and many other attributes that may be used (e.g., as metadata) to identify cues for presentation to user 101, as well as users 101*a*, to elicit relevant memories to either recollection 112 or recollection 116, or both. Based on the one or more attributes of user 101, may be configured to generate cues as "text"-based cues (e.g., news stories, archived emails or text messages, literary and written media, including books, etc.), "image"-based cues (e.g., photographs or other static imagery, animated imagery, video, etc.), "audio"-based cues (e.g., music, songs, sound effects, etc.), or any other type of medium in which stimuli may be presented to a user to evoke a memory or recollection.

Presentation processor 153 may be configured to identify one or more subsets of cues to display in association with collaborative recollection interface 110 for presentation to user 101. In some examples, the display of cues may be a function of user's 101 actions or users' 101*a* actions, regardless of whether passive or active. Cue processor 152 may be configured to track and identify which cues provide relatively higher probabilities of sparking or eliciting memory recall for a specific user 101 or users 101*a* in the aggregate to affect cue display in collaborative recollection interface 110. In some cases, presentation processor 153 and/or cue processor 152 may determine a degree of relevancy of one or more cues (e.g., based on probabilities) for each cue of a subset of cues, whereby cues of greater degrees of relevancy are prioritized for presentation in a user interface at computing device 102 for user 101 (e.g., cues calculated to have lower degrees of relevancy may not be presented, at least initially). A degree of relevancy may be determined, for example, on a measure of closeness or similarity in terms of time, location, personal relationship, activity, etc. For example, memories or recollections of a person (i.e., "person B") vacationing in Bali in 1985 may be relevant to another person who had vacationed in Bali in 1975 (i.e., "person A"), with at least at a greater degree of relevance than to a person (i.e., "person C") who vacationed in Tokyo, Japan in 1980. Thus, photos, text, or other information relating to user B's experience in Bali may be presented via presentation processor 153 to person A. However, if persons A and C experienced earthquakes or other equivalent events, then person C and related information may be presented (e.g., as a cue) to person A. Hence, a cue may be designed to spark memories and assist in recall, and they may also provide "color" (e.g., supplemental information) or context to memories. For example, a memory cue might include the weather of the memory at the time (e.g., weather in Bali on Dec. 31, 1973), photos of the area (e.g., photos of Kuta beach, or losmens in the area), or any other contextual information, such as exchange rates, prices of food, and names of places of interest in the area. The aforementioned information may be determined based on other users' 101*a* memories as well as public sources (e.g., any information available or accessible via the Internet, or other like data source).

Cues may be displayed adjacent recollection 112 or 116, such as in cue presentation interface 120. Presentation processor 153 may be configured to identify a subset of news and current event-related cues 121 related to a time period including the date of Dec. 31, 1973 for recollection 116 (e.g., cues describing relevant earthquake news, local events, weather, sporting events, etc.). Presentation processor 153 also may be configured to identify: (1) a subset of video and imagery cues 122 (e.g., cues describing TV shows, commercials, movies, landscape photos and images, art, etc., and/or portions thereof), (2) a subset of audio and sound effect-related cues 123 (e.g., music, sounds, TV and movie soundtracks, voiced sounds, other sounds, etc., and/or portions thereof), (3) a subset of literary and written media-related cues 124 (e.g., books, newspapers, postcards, magazines, other written materials, etc., and/or portions thereof), (4) a subset of geographic-related cues 125 (e.g., exchange rates, places of interest, food prices, other localized cues, etc.), and any other types of cues based on, for example, metadata of a memory. Thus, cues may include notable events that happened around the same time and/or location as a memory. Note that in some examples, presentation processor 153 may be configured to display one or more cues interspersed between memories or recollections 112 and 116. According to various examples, the above-described cues presented in cue presentation interface 120 may originate from publicly-available information, such as newspapers "The Bali Times," "The San Jose Mercury News," "The Wall Street Journal," etc., or magazines, such as "Time," "Fortune," etc. The type of media or cues may be selected as a function of geographic location, an interval of time, and the like.

In some examples, presentation processor 153 may be configured to allow user 101 and users 101a to view, in various ways, memories and recollections that they create, or otherwise have permission to access or otherwise view. In some examples, cue processor 152 may allow users to sort by metadata including, but not limited to, creation date, date of a recollection or memory, etc. A recollection or memory may be filtered or otherwise searched by categorical types, such as location and memories that involve a certain user 101 or a certain one of users 101a. Further, presentation processor 153 may be configured to provide various presentation or viewing options to modify presentation of recollections 112 and 116, as well as cues and other displayed items in collaborative recollection interface 110. For example, presentation processor 153 may sort or configure the display of items based on a "date of a memory" to form, for instance, a default timeline 111 of user's 101 memories. Also, various presentation or viewing options to modify presentation of recollections 112 and 116 and/or cues may be configured to evoke memories based on, for example, user preferences, which may be manually-defined or may be determined probabilistically (e.g., via machine learning, or other artificial intelligence-based logic).

To enhance presentation of recollections and cues, collaborative recollection interface 110 may include a timeline view enhancement interface 130, which may include a geographical display portion 132 as a map portraying geographic locations associated with recollections or memories. As shown, location 131 may be presented in association with a recollection, such as recollection 112 or 116, related to that location, such as a vacation in Bali. Tag view 133 includes "tags" or keywords that may be used to facilitate searching and linking users 101 to users 101a and any of cues 121 to 125. According to some examples, the "tags" or keywords in tag view 133 may be entered by a user (not shown) or may be automatically generated or identified by collaborative recollection engine 150. People view 134 depicts circles of friends, family members, or other people whose memories may overlap with user's 101 recollections based on, for example, one or more of a location, a time frame, an interest, an activity, and the like. To illustrate, consider that both user 101 and another user 101a visited Bali within a common range of time. For example, user 101 visited Bali in 1973 and one of user 101a visited Bali in 1975. Further, people view 134 may also be configured to depict a measure of a relative degree of association (e.g., a degree of relevancy) between user 101 and any other user, such as user 104. In particular, a magnitude of distance 105 may represent an amalgam value representing a degree of association with users (e.g., based on an amalgam of attribute values), whereby the degree of association (or relevancy) may be used to compare other users' relationships to user 101 (and applicability of the others' memories to user 101).

In at least one example, distance 105 may represent an amalgam value based on types of relationships between user 101 and user 104, and/or relative proximities of geographic locations of user 101 and user 104 at a particular time frame. In some cases, distance 105 may be indicative of a magnitude that represents an amalgam value as a "total" degree of similarity between two users, whereby the amalgam value may represent an aggregation of individual distances between values of certain user attributes. For example, an amalgam value between user 101, who is 60 years old, has traveled to Brazil, is a sailor, and is a doctor, and other similar users 101a will have amalgam values indicating a degree of closer similarity than other users, such as other users that are 20 years old, have never travel, and are college students. As another example, user 101 may have been in Bali in July 1974 and user 104 may have been in Jakarta at the same time, so they both may have experienced common experiences relating to weather, such as a typhoon, or other events including earthquake events. Thus, experiences of user 104 may be more relevant with which to determine a cue for user 101, rather than, for example, users that may have been in Ireland at that time. Timeline view enhancement interface 130 may include other view options 135 with which to sort or present recollections or cues based on experiences of other users 101a for purposes of eliciting or retrieving a memory based on, for example, an "emotion" associated with a particular recollection (e.g., grief, shock, sadness, etc. for recollection 112). While not shown, other mechanisms may be implemented in timeline view enhancement interface 130 to modify view of collaborative recollection interface 110.

Adaptive recollection processor 154 may be configured to adapt a recollection, such as recollection 112 and 116 for presenting different versions of the recollection to different users 101a (e.g., different classes of users 101a). For example, user 101 may initiate executable instructions to "redact" or "modify" viewing access of certain parts of recollection 112 or 116 for specific users, while allowing the same users to view the rest (or other portions) of the recollection or memory, such as recollection 116. As such, different versions of a same memory may be shown depending on who is viewing recollection. In some cases, different versions of the same content may be shared with different individuals, or groups of individuals, by selectively redacting, modifying, and/or concatenating the content. For example, text 117 may be modified to remove text 117a, which is a portion of text 117, whereby text 117a describes an event with friends that user 101 would rather not share with his or her parents or children. Modified or redacted text 117a, for example, may include removal or revision of profane language or other memories that ought only be shared among close friends. So, adaptive recollection processor 154 may tailor the same story as a different version to particular a class of reader (e.g., a slightly different version may be available for a parent or child versus a close friend, such as a "drinking buddy"). In some cases, a reader may not discern or detect that the version is modified or "cleaned" for purposes of sharing with that reader.

Figure 2:
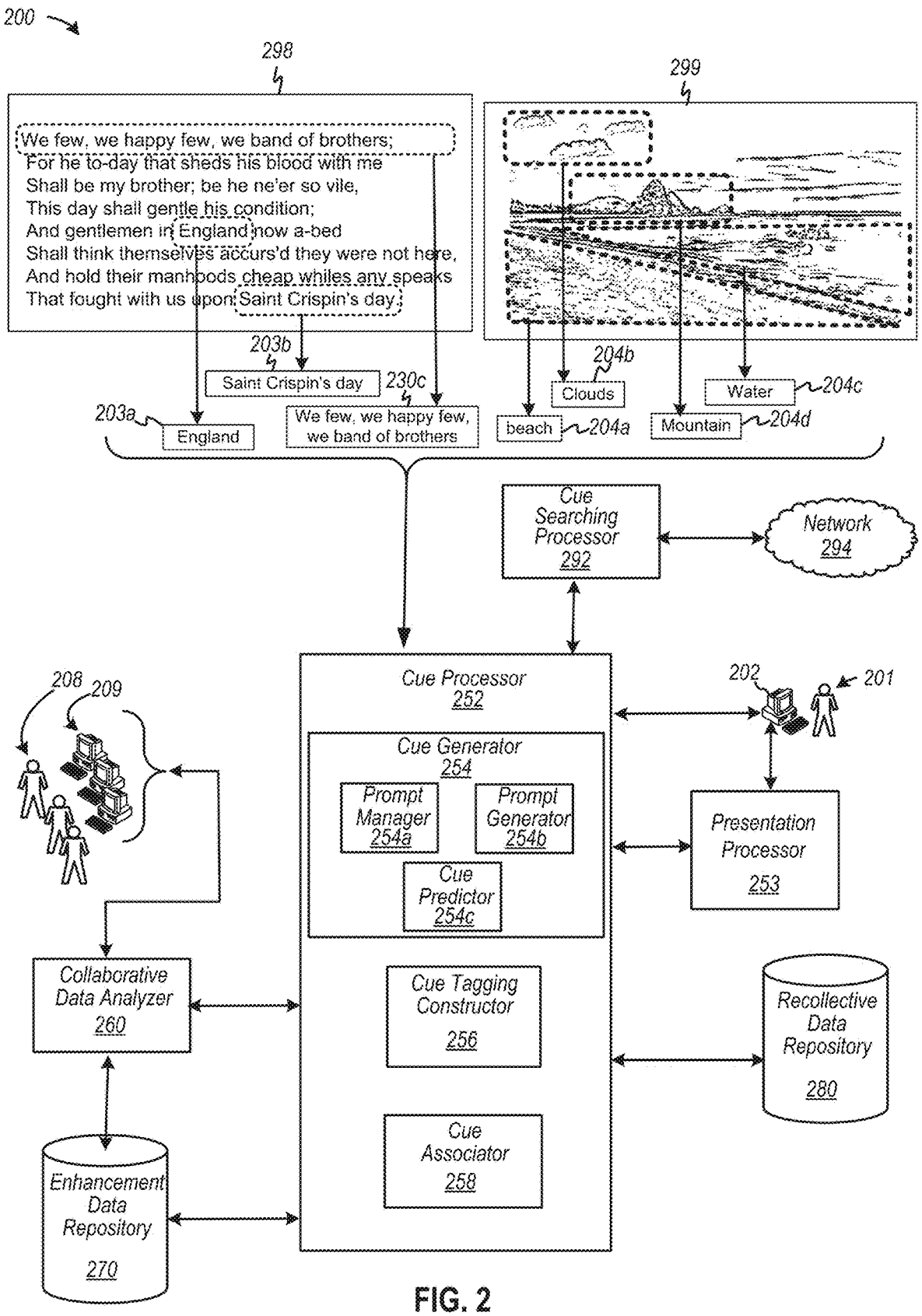
FIG. 2 is a diagram depicting an example of a cue processor configured to generate one or more memory cues, according to some examples.

In some examples, user 101 may implement a mobile computing device 140 to log data representative of events at certain geographic locations to generate cues (e.g., predictive cues as described, for example, as generated by cue predictor 254c of FIG. 2), whereby data logging may be manually performed or automatically performed under control of executable instructions. For example, an application on a mobile computing device (e.g., a mobile phone) may be configured to detect one or more digital images (photos) being captured, each digital photo associated with a location (e.g., GPS coordinates). Upon detecting that a photo is captured, the application may log data representing contemporaneous emails, text messages, phone calls (e.g., initiated and received), music played via a music application, etc. Thus, a person at the Grand Canyon who takes pictures while listening to Beethoven's Für Elise may have linked the recollection of the Grand Canyon to a particular song, which may be a cue for recollecting an experience at some time in the future. Therefore, user 101 and/or an application on a computing device (associated with user 101) may add a cue to promote future remembering and to evoke "anticipatory nostalgia." For example, a user may add to their timeline 111 a soundtrack for each place they travel. At some subsequent point in time, user 101 may listen to a song of soundtrack again evoke vivid memories of the places user visited while experiencing the song. As another example, mobile computing device 140 of FIG. 1 may enable use of voice dictation via an application disposed on mobile computing device 140 to perform one or more functionalities described herein, such as collaboratively identifying recollections, and enriching such recollections with information associated with elicited memories (e.g., elicited in response to perceiving a particular cue).

According to some examples, collaborative recollection engine 150 may be configured to limit "onward sharing" of recollections or other information associated with a system implementing collaborative recollection engine 150. As an example, user 101 may generate recollections 112 and 116, each of which may have data representing sharing limitations associated thereto. A sharing limitation may prevent a user 101*a* from continuing to propagate or share with other users that user 101 does not authorize. Thus, recollections and other personal information are maintained with some levels of privacy. "Onward sharing" of recollections or propagation of personal memories may be limited by implementing any of various cryptographic technologies, including embedding recollections, or access thereto, in data arrangements implementing blockchain technology.

In some cases, collaborative recollection engine 150 may be configured to facilitate sharing of recollections 112 and 116 externally or outside a subset of users 101*a*, who may be identified as having direct interpersonal relationships with user 101. Thus, user 101 may share publicly recollections 112 and 116 with any user, known or unknown, to external user 101*a*. In one instance, content for generating cues 121 to 125 of cue presentation interface 120 may be retrieved through subscriptions of content based on "tags," which may be automatically-generated tags (e.g., "auto-tags"). For example, recollections or memories of personal experiences in Bali during the 1970s and memories of the Iranian Revolution may be supplemented by any user of collaborative recollection engine 150 to assist user 101 to evoke details to enrich the memories of user 101. To illustrate, user 101 may have his or her memory refreshed upon receiving information from another user that stayed at the same losmen in Bali as user 101, although during the following year, and reminisced that the cost was 2,000 rupiah.

According to some examples, collaborative recollection engine 150 may be configured to generate a prompt or a cue for presentation to one or more users based on detecting an event or change in user attribute status. For example, a prompt may be generated based on a marriage, a change in job, a change in residence, etc. Also, prompts may be filtered by relative values of attributes. For example, users aged between 30 and 40 years may be identified as receiving a certain subset of prompts (e.g., related to purchasing a home, child-raising, etc.), whereas users older than 50 years may be presented different prompts (e.g., related to retirement plans, caring for aging parents, etc.). In at least one case, a user may see responses to certain prompts if they meet a certain criteria (e.g., they see Prompt A if they are over 30 years old, and they see Prompt B if they are not married).

FIG. 2 is a diagram depicting an example of a cue processor configured to generate one or more memory cues, according to some examples. Diagram 200 depicts a cue processor 252 including a cue generator 254 configured to generate cues, a cue tagging constructor 256 configured to identify and associate tags or other identifiers to data representing cues, and a cue associator 258 configured to associate one cue to another cue, for example, by associating an attribute of one user to another attribute (e.g., attribute of another user, attribute describing a time, attribute describing a geographic location, etc.). One or more elements depicted in diagram 200 of FIG. 2 may include structures and/or functions as similarly-named or similarly-numbered elements depicted in other drawings, or as otherwise described herein, in accordance with one or more examples.

Diagram 200 depicts cue processor 252 including logic, for example, disposed in cue tagging constructor 256, which may include one or more natural language processing algorithms to identify textual terms of text 298 as, for example, "tags." For example, "auto-tagging" (i.e., automatic detection and tag association) of content may include identifying content portions (or units of content), such as imagery, text, sounds, etc., for purposes of searching or characterizing the content to identify cue attributes. In the example shown, cue processor 252 may be configured to generate tags 203*a*, 203*b*, and 203*c* as cue attributes. The logic in cue tagging constructor 256 may also include image recognition processing algorithms to identify features of a digital image 299 to identify "tags" automatically associated with image 299. For example, cue tagging constructor 256 may be configured to derive tags 204*a*, 204*b*, 204*c*, and 204*d*, all of which may be associated with a photo 299 of Kuta Beach, Bali. In some examples, logic in cue tagging constructor 256 may include image recognition processing algorithms to match image 299 to a library of images stored in, for example, recollection data repository 280 for purposes of matching images to known images so that image 299 may be identified as being of Kuta Beach. The logic may also be configured to perform facial recognition (not shown) to identify which one of users 208 (e.g., friends, family members, etc.) may have been present in a shared experience with user 201 while at Bali. The logic may be further configured to automatically detect a user's name (e.g., via facial recognition algorithms) in an image and automatically tag the image with detected user name as metadata. Additionally, the logic may generate "geo-tags" automatically based on matching image 299 to other photos of Kuta Beach to identify the subject of image 299 as Kuta Beach. A geo-tag may include geographic information, such as longitude and latitude coordinates (e.g., via GPS receiving circuitry) associated with image 299, as well as any other information associated with image 299. In some cases, other users 208 may assist in providing information (e.g., as metadata), especially those users who might photos of the same place (e.g., at the same or similar time). If image 299 is publicly-available, cue processor 252 may be configured to ask if user 201 may wish to include image 299 with user's 201 recollection as part of a story to provide additional context or to fill in blanks of one's memory (e.g. user 201 may have very few or no photos similar to image 299, whereby a publicly-available photo or digital image may be implemented as a cue).

Cue generator 254 of diagram 200 is shown to include a prompt manager 254*a* configured to manage which prompts are most likely to retrieve information to effectively generate cues to evoke memories, a prompt generator 254*b* configured to generate and present prompts, and a cue predictor 254*c* configured to predict which cue or subset of cues may be optimal to solicit feedback from a user 201 as well as eliciting a recollection or memory from same. A prompt may include a portion of text (or audio recording, etc.) that may be related to a memory cue to recall a memory. A prompt may either come in the form of a statement or a question (as presented via presentation processor 253 on a display of computing device 202), and may be personalized by prompt manager 254a based on user 201 actions. Prompt generator 254b may generate prompts to apply to a wide group of people, and may be sufficient to evoke a specific memory for user 201 or users 208. An example of a prompt would be "What did you do on your 21$^{st}$ birthday?" For example, a prompt may trigger a recollection and recording of such an event by a user, such as user 201 or one of users 208, who typically have had a 21st birthday, may also be prompted to provide context and attributions associated with such event to enrich the user's recollection or so that the user may more readily recall a memory related to a particular event. User 201 or users 208, who typically have had a 21st birthday, may likely be able to provide context and attributes in association with an event, so that a user may more readily recall a memory. Some prompts may be generated based on the characteristics or attributes of user 201 or users 208 (e.g., based on data in a user's profile and other information). If a user was part of an institution or group, such as a military unit or a fraternity, prompt generator 254b may generate prompts regarding their experiences while part of that organization or group (e.g., "Please describe a memorable match when you were on the varsity wrestling team."). In some examples, prompt generator 254b may also create prompts based on user's 201 friends, such as directing questions to user 201 about shared experiences with users 208 as friends.

Collaborative data analyzer 260 may be configured to receive data via computing devices 209 from users 208, whereby the data may include attributes of each user 208 as well as information with which attributes (e.g., user attributes for a user 208 may be derived. If, for example, a user 208 posts to, or interacts with, a jazz-related Facebook™ website, collaborative data analyzer 260 may scrape (or extract) data from that website for purposes of inferring that user 208 has a musical preference for jazz music. Thus, jazz music may be a genre from which musical cues (as a derived cue) may be selected. In some cases, collaborative data analyzer 260 may be configured to store one or more attributes in enhancement data repository 270

Cue associator 258 may be configured to identify one or more attributes (e.g., user attributes, location attributes, activity attributes, etc.) of, for example, a user 208, who is a jazz aficionado, based on data stored in enhancement data repository 270. Further, cue associator 258 may be configured to associate jazz music as a cue for user 201, even though user 201 may not be a jazz aficionado. However, if user 201 and 208 frequently vacation together, and user 208 plays jazz often, then jazz music, as a cue, may cause user 201 to recollect a memory and that otherwise might not be recalled easily. According to various embodiments, cue associator 258 is configured to facilitate "mind pop"-like memory recalls, which may be spontaneous and involuntary. A mind pop memory may be a tangential thought or recollection that may be triggered by the act of recollecting another memory. So a memory cue of jazz music (e.g., "memory X") may evoke another memory (e.g., "memory Y"), such as a memory of driving to a restaurant, which may have coincided with a vacation in which a jazz song was part of a past experience.

According to some embodiments, cue processor 252, cue associator 258, and/or cue predictor 254c may be configured to determine or predict a cue for presentation to a user based on similarities to one or more user attributes of other users associated with cues, similarities to one or more location attributes associated with cues, similarities to one or more activity attributes associated with cues, similarities to one or more time frames or ranges associated with cues, and the like. In at least one implementation, a combination of one or more of the foregoing may be aggregated to form an amalgam value, or may be analyze to determine a degree of relevancy of the potential cue for presentation to a user based on the relevancy of one or more of user attributes, location attributes, activity attributes, time frames or ranges, etc. In one example, cue predictor 254c may be configured to predict a suggested cue based on auto-tagged content (e.g., because user 201 wrote about memory "X," user 201 might be interested in reading about someone else, such as user 208, who wrote about memory "Y."). According to various embodiments, a collaborative recollection engine may be configured to present predicted cues to user 201 and users 208 using various psychologically-supported techniques to evoke memory recall in the future. Thus, cue predictor 254c may generate predicted cues (e.g., future cues).

Predicted cues, or future cues, are cues that may be interspersed with events as they occur to facilitate recall when a predicted cue is presented to user 201 and users 208 at a later date. An example of a future cue would be a school's victory song that is played after every sporting win, which then may be played to assist in eliciting remembrances of past sporting victories and the feelings associated with those memories (e.g., evoking memories as "anticipatory nostalgia"). Cue predictor 254c may generate predicted cues, which may be based on using statistical analysis and machine learning techniques to derive cues that likely may be predictive of evoking recollections for a particular user based on, for example, the attributes of a user.

In some examples, cue processor 252 may be configured to allow user 201 and users 208 to state their preferences regarding presentation of cues so as to affect what types of cues user 201 may experience. For example, user 201 may prioritize the display of relevant music as cues over the display of relevant events as cues, based on preferences. In at least one example, cue processor 252 may be configured to enable users to achieve a relatively high degree of granularity in viewing settings of the memories. In one case, published memories or recollections may be commented upon and voted upon by other users 208 through various methods, such as an up-vote and down-vote system, or a "like" system. Hence, a prompt manager 254a may select which cue to present based on the qualities of votes or quantities of "likes."

According to some examples, cue processor 252 may be configured to generate cues based on, for example, content stored in association with a collaborative recollection engine, such as units of content 298 and 299, which may be viewed as intra-system media content. Cue searching processor 292 includes logic to search various computing and storage devices (e.g., web sites accessible v via network 294) to identify external content, or extra-system media content. Thus, content that may be unassociated with (or unknown to) users 201, 208, and 209 may be harvested or otherwise identified for generating cues. For example, photos of a blogger's vacation to Fiji may be identified even if the blogger is not a user of a collaborative recollection engine. In response, the collaborative recollection engine may determine contact information to invite the blogger to join as a user, thereby establishing a user account to enrich the blogger's memories and experiences, as well as others' memories and experiences. In a further example, cue searching processor 292 may access proprietary databases, such as historical or digital archives related to a specific location (e.g., the city of Palo Alto) or an institution (e.g., Stanford University). Thus, proprietary databases may be accessible by users of collaborative recollection engine. In some cases, a user of a collaborative recollection engine may be granted access to a database of an archive or institution via login or authorization data. In return, a database owner may receive data, such as data representing cues that had greatest user interactions, or the like.

Figure 3:
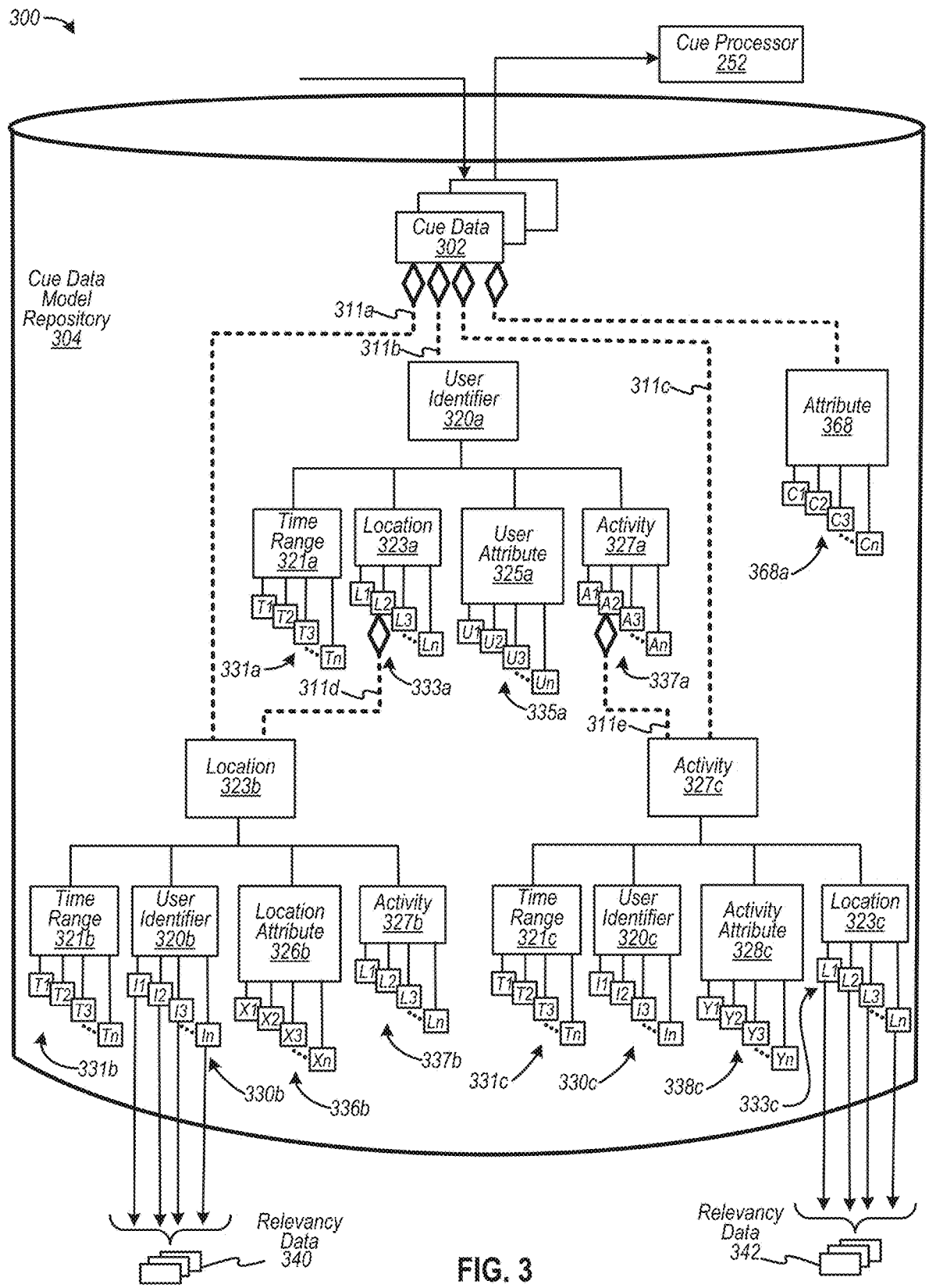
FIG. 3 is a diagram depicting an example of storing cue data in accordance with a cue data model, according to some examples.

FIG. 3 is a diagram depicting an example of storing cue data in accordance with a cue data model, according to some examples. Diagram 300 depicts a cue data model repository 304 including a cue data model as an example for forming a data arrangement in which cue data 302 may be stored. Further, cue data 302 may be associated with (e.g., linked to) units of data representing cue attributes. As shown, cue data 302 may be associated with one or more cue attributes that may include: data representing a user identifier 320a to uniquely identify a user (e.g., via a user account), data representing a location 323b (e.g., a geographic location, an institution or building, a domicile, etc.), data representing an activity 327c (e.g., sporting activities, leisure activities, such as performed during a vacation, etc.), data representing other attributes 368 of a cue, or any other type of cue attribute data. Examples of attributes 368 of a cue may include other tags or metadata associated with content, such as an image (e.g., a "cloud" tag, a "beach" tag, a "mountain" tag, etc., such as depicted as tags 204 of FIG. 2), a portion of audio (e.g., genre, artist, or other music-related metadata). Attributes 368 of a cue may also include attributes of a portion of text (e.g., extracted key words as tags), etc. In some examples, a data structure for each of user identifier 320a, location 323b, activity 327c, and attribute 368 may be data objects (or instances thereof) based on any data modeling technique (e.g., entity-relationship modeling, object-relational mapping, etc.) and may be implemented using any programming language, such as Java™, JavaScript™, JSON, Python™, C++™, PHP, SQL, SPARQL, HTML, XML, and the like. Data structures for each of user identifier 320a, location 323b, activity 327c, and attribute 368 may be stored separately or may be linked together to form a combined data structure. One or more elements depicted in diagram 300 of FIG. 3 may include structures and/or functions as similarly-named or similarly-numbered elements depicted in other drawings, or as otherwise described herein, in accordance with one or more examples.

User identifier 320a, which can be linked to cue data 302 (e.g., via association 311b), includes data associated with identifying a particular user, such as a user account identifier, and may further link to data representing a time range 321a, data representing a location 323a, one or more user attributes 325a, and data representing an activity 327a. Data representing time range 321a may describe, for example, a point in time or a range of time during which a user associated with user identifier 320a interacts with a collaborative recollection engine. Or, data representing time range 321a may describe a point in time or ranges of time associated with a recollection. As shown, data representing one or more time ranges 321a may include time range attribute data (e.g., T1, T2, T3, . . . , Tn) 331a, each of which may associate a date or date range, a year, a season, or other time-related information to a user of user identifier 320a. Data representing location 323a may describe, for example, a location at which a user associated with user identifier 320a visits or has visited. Or, data representing location 323a may describe a location associated with a recollection. As shown, data representing one or more location 323a may include location attribute data (e.g., L1, L2, L3, . . . , Ln) 333a, each of which may associate a geographic location by name (e.g., city or country name), a geographic location by coordinate (e.g., GPS coordinates), a place, a building (e.g., a college or business building), or other spatial or location-related information that may relate to a user of user identifier 320a.

Data representing user attributes 325a may describe, for example, a characteristic or attribute of a user associated with user identifier 320a. As shown, data representing one or more user attributes 325a may include user attribute data (e.g., U1, U2, U3, . . . , Un) 335a, each of which may associate a user attribute to a user identified by user identifier 320a. Examples of user attribute data 335a include a name, an age, contact information or identifiers (e.g., an email address), academic-related information (e.g., colleges or other schools attended, degree, major, college-level or intramural sporting memberships, employment history, and any other characteristic, such as any demographic information. Data representing activity attributes 327a may describe, for example, a characteristic or attribute of an activity in which a user has or is participating, the user being associated with user identifier 320a. As shown, data representing one or more activity attributes 327a may include activity attribute data (e.g., A1, A2, A3, . . . , An) 337a, each of which may associate an activity attribute to a user of user identifier 320a. Examples of activity attribute data 337a include a sport (regardless whether participating or spectating), a leisure activity (e.g., during vacation), a hobby, one or more exercises as part of a fitness regimen, interests, musical performances, and any other activity-related characteristic. Therefore, in view of the foregoing, content representing a cue (e.g., a portion of text, an image, a portion of audio, etc.) may be include time-related tag data, location-related tag data, and activity-related tag data via user identifier data 320a.

Note, however, cue data 302 may be include time-related tag data, location-related tag data, and activity-related tag data regardless of whether a particular user identifier 320a is associated therewith. As shown, location data 323b and activity data 327c may be linked via associations 311a and 311c, respectively, to cue data 302. Thus, via link 311a, cue data 302 may include time range data 321b (e.g., including any number of time-related attributes 331b), user identifier data 320b (e.g., one or more user identifiers 330b, such as I1, I2, I3, . . . , In, any of whom may have visited a location), location attribute-related data 326b (e.g., location attributes 336b, such as attributes X1 to Xn) for a location 323b, and activity data 327b, which may include activity-related attributes 337b associated with location 323b (e.g., describing activities performed at a particular location). Similarly, cue data 302 for a cue may be related via link 311c to time range data 321c (e.g., including any number of time-related attributes 331c), user identifier data 320c (e.g., one or more user identifiers 330c, such as I1, I2, I3, . . . , In, any of whom may have participated or involved in an activity associated with activity data 327c), activity attribute-related data 328b (e.g., activity attributes 338c, such as attributes Y1 to Yn) for an activity 323c, and location data 323c, which may include location-related attributes 333c associated with activity 327c (e.g., describing locations at which a particular activity may be performed).

According to some examples, location data 323a, 323b, and 323c may include equivalent location data (e.g., a name of a country, such as France). Also, activity data 327a, 327b, and 327c may include equivalent activity data (e.g., attending a college reunion, participating in a rugby match, etc.). Further, location data 323b may linked (via link 311d and through location data 323a) to user identifier 320a as an attribute (e.g., "L2") 333a. In this case, time range data 321b, user identifier data 320b, location attribute-related data 326b, activity data 327b, and corresponding attributes, are accessible via user identifier 320a. Further to this implementation, time-related attributes 331b may describe the time (e.g., dates) during which a user associated with user identifier 320a is at location 323b. One or more user identifiers 330b may identify other users (e.g., other family members or colleagues) at the same location, which may be identified by one of location-related attributes 336b, during which the user associated with user identifier 320a is also at that location. Activity-related attributes 337b associated with location 323b may describe those activities performed by the user at a particular location (e.g., rather than for all users). By accessing data via links 311b and 311d, a cue processor can filter or select subsets of relevant data based on a combination of user identifier 320a and location 323b. Similarly, activity data 327c may link (via link 311e and activity data 327a) to user identifier 320a as an attribute (e.g., "A2") 337a. In this case, time range data 321c, user identifier data 320c, activity attribute-related data 328c, location data 323c, and corresponding attributes, may be accessible via user identifier 320a. Further to this implementation, time-related attributes 331c may describe the time (e.g., dates) during which a user associated with user identifier 320a is engaged or otherwise involved in activity 327c. One or more user identifiers 330c may identify other users (e.g., other family members or colleagues) involved with an activity the user associated with user identifier 320a. Location-related attributes 333c associated with location 323c describe those locations at which an activity may be performed by the user (e.g., rather than for activities for all users). By accessing data via links 311b and 311e, a cue processor can filter or select subsets of relevant data based on a combination of user identifier 320a and activity 327c. According to some embodiments, a user may select or filter cues consistent with each user's preferences. For example, a user may initiate executable instructions that identify one or more preferred cues by accessing data via any of links 311a to 311e.

According to some examples, a cue processor 252 may analyze cue attribute data link to cue data 302 or may compare data representing a potential cue against data stored in cue data model repository 304 to determine whether to present to cue to a particular user. As such, cue processor 252 may be configured to generate prompts and/or cues that may change or adapt to reflect life changes. For example, if a user lived in Japan between 1986 and 1997, which may be determined explicitly from user input or inferred by a collaborative recollection engine (not shown), then the top news events for each year during that period may be presented as "local events" in interface portion 121 of FIG. 1, whereby the local news events in Japan during that from 1986 to 1997 are presented to the user (rather than U.S.-related news). Cue processor 252 may access a user identifier 320a identifying that user, location data 323b indicating "Japan," and time-related attributes describing the time range "from 1986 to 1997." Hence, cues matching those attributes may be presented, whereas other locations during that time or other times in Japan may be suppressed. Similarly, if a user, who is born and raised in India (e.g., a citizen of India) attends college in the U.S. for several years, then cues and prompts may be adapted to U.S.-related content for those years. Thus, content originating in India for the years that the user was living in India prior to moving to the US may be suppressed or prevented from being exposed to the user.

According to some examples, values of cue attributes, such as values of time-related attributes, values of user-related attributes, values of location-related attributes, values of activity-related attributes, and the like, may be compared against each other to determine various levels or degrees of relevancy multiple cues may have for a particular user based on one or more degrees of relevancy. For example, an individual vacationing in Bali during the 1980s is likely to experience activities or other experiences at that location (or adjacent locations) than other individuals vacationing in the south of France during that time. Further, the individual vacationing in Bali during the 1980s may likely share similar experiences with individuals vacationing there in the 1970s or 1990s rather than in an individual vacationing there in 2011 (e.g., due to changes in demography, buildings, such as new hotels, environmental-related afflictions, such as from the effects from earthquakes, typhoons, tsunamis, etc.).

Relevancy data may be generated to describe a degree of relevancy or similarity between values of an attribute so as to facilitate optimal cue generation and presentation. While relevancy data may be generated for any of the above-described attributes, diagram 300 depicts relevancy data 340 to describe degrees of relevancy for user-related attributes 330b. Diagram 300 also depicts relevancy data 342 that describes degrees of relevancy for location-related attributes 333c. A value of a degree of relevancy indicating that attribute A and attribute B are more similar than attributes A and C, then a cue based on attribute B may be presented rather than a cue associated with attribute C. Examples of implementing relevancy data 340 and 342 are depicted in FIGS. 4A and 4B.

Figure 4A:
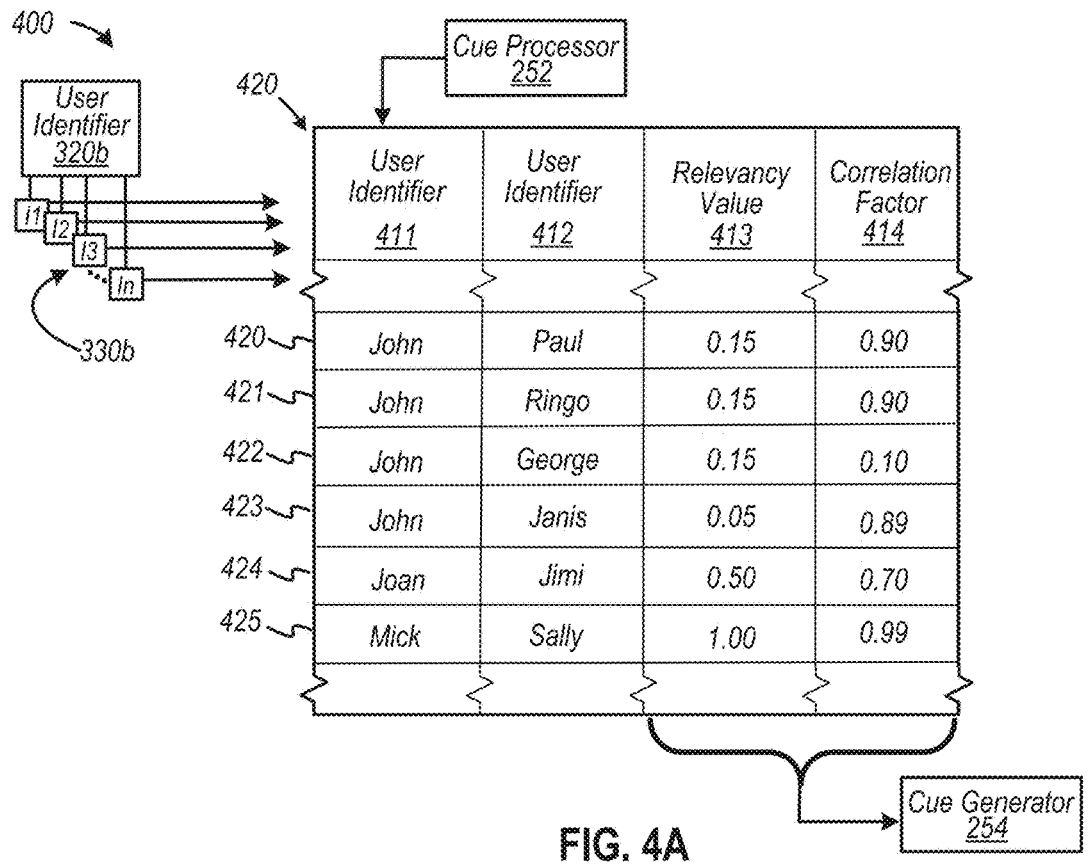
FIGS. 4A and 4B examples of determining relevancy of cue attributes to determine whether to present a cue to a user, according to some embodiments.
Figure 4B:
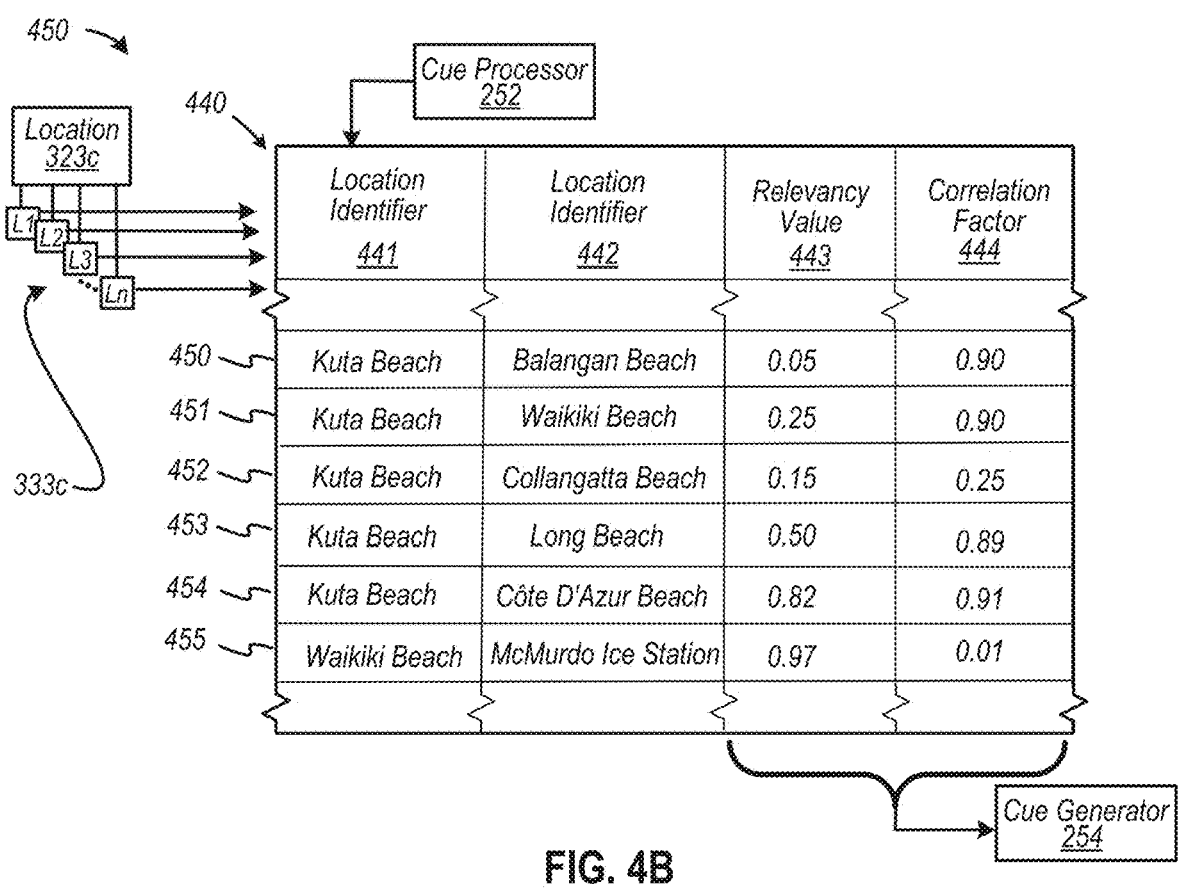

FIGS. 4A and 4B examples of determining relevancy of cue attributes to determine whether to generate or present a cue to a user, according to some embodiments. Diagram 400 depicts implementation of user identifier data 320b and associated attributes 330b in a data arrangement 420. User-related attributes may include user identifiers, such as one or more user identifiers 411 and 412, such as "John," "Paul," "Ringo," "George," "Janis," "Joan," "Jimi," "Mick," and "Sally," and may include associated relevancy values 413. In some examples, a relevancy value 413 indicates a type of relationship between at least two users. In this case, relevancy values 413 range from "0.00" to "1.00." The value 0.00 is indicative of substantially zero "distance" between attributes (e.g., either the same or very similar, based on a close personal relationship), whereas value 1.00 may be indicative of a great distance between attributes (e.g., attributes having dissimilar values, and thus little to no relationship exists). According to some examples, a type of relationship between users may be characterized by a relevancy value. For example, records 420 to 422 indicate relevancy values of "0.15" between John and each of Paul, Ringo, and George, whereby 0.15 may represent a relationship in which two users are very good friends. Record 423 has a relevancy value of "0.05," which may indicate a familial or spousal relationship. Record 424 includes a relevancy value of 0.50, which may indicate an acquaintance or collegial relationship between Joan and Jimi, whereas relevancy value of "1.00" in record 425 may indicate that Mick and Sally may be strangers and/or unaware of each other. According to various examples, cue processor 252 may determine values for relevancy values 413. In some cases, a relevancy value may be determined empirically. In other implementations, relevancy values 413 may be determined probabilistically. In one instance, relevancy value 413 may be a function of one or more relationship-based aspects, such as a frequency of interaction between individuals (e.g., frequency in which emails or text messages are exchanged). According to some examples, relevancy value 413 may include a value derived by one or more interactions between one or more users and a computing system platform, such as a collaborative recollection engine described herein.

In some examples, an optional correlation factor 414 may be implemented, whereby a value of a correlation factor may be used to modify relevancy value 413 based on other attributes. In some cases, a lower correlation factor value indicates, for example, a relevancy value between two attributes may be less relevant for generating a cue or a prompt as a function of a different attribute. For example, consider that relevancy values 413 between John and Paul, between John and Ringo, and between John and George are 0.15, which indicates each are close friends. However, consider their relationships are analyzed in the context of a location attribute. For example, consider that John, Paul, and Ringo frequently vacation in Hawaii together, but George does not. Next, consider a cue generator 254 being configured to generate a cue relevant to Hawaii as a location-related attribute. As shown, George has a correlation factor value of "0.10," which indicates the relevancy as friends may limit presentation of Hawaiian-related cues to George, unlike a correlation factor value of "0.90," which indicates a greater correlation between a location-related attribute and the relationship between John, Paul, and Ringo. Thus, John, Paul, and Ringo may be more likely to receive Hawaiian-related cues than George based on their friendship.

Diagram 450 of FIG. 4B depicts implementation of location data 323*c* and associated attributes 333*c* in a data arrangement 440. Location-related attributes may include location identifiers, such as one or more user identifiers 441 and 442, such as "Kuta Beach," "Balangan Beach," "Waikiki Beach," "Collangatta Beach," "Long Beach," "Côte D'Azur Beach," and "McMurdo Ice Station," and may include associated relevancy values 443. For example, records 450 to 454 indicate relevancy values of ranging between "0.05" and "0.82" between Kuta Beach and other beaches at different geographic locations. In the example shown, relevancy values 443 may be indicative of a distance between beaches or geographic locations, whereby activities or user interactions at closer locations may be more relevant than remote distances. Note that Kuta Beach and Balangan Beach are separated by about 22 km in Bali, whereas Kuta Beach and Cote D'Azur Beach in France are located at opposite ends of the globe. As McMurdo Ice Station is located in Antarctica, Waikiki Beach may be dissimilar from Antarctica. Hence, record 455 includes a relevancy value of "0.97."

In some examples, an optional correlation factor 444 may be implemented, whereby a value of a correlation factor may be used to modify relevancy value 443 based on other attributes. In some cases, a lower correlation factor value indicates, for example, a relevancy value between two attributes may be less relevant for generating a cue or a prompt as a function of a different attribute. For example, consider the distance between Kuta Beach and Collangatta Beach is about one-half the distance between Kuta Beach and Waikiki Beach. As shown, relevancy value 443 between Kuta Beach and Waikiki Beach, Hawaii may be 0.25, whereas relevancy value 443 between Kuta Beach and Collangatta Beach, Australia may be 0.15, which indicates that Australian beach may be more geographically-relevant than U.S. beaches. Further, consider a user frequents both Kuta Beach and Waikiki Beach, but has not yet visited Collangatta Beach. As such, geographic relevancy value 443 of 0.15 for Collangatta Beach may be less relevant to a user who has not visited the Australian beach. Cue generator 254 may be configured to detect a lower correlation value 444 for record 452 relative to correlation value 444 of record 451. Therefore, cue generator 254 may generate a cue relevant to Hawaii (e.g., a cue generated as a function of a location-related attribute), thereby suppressing or prohibiting generation of Collangatta Beach-related cues. According to various examples, correlation factor values 414 of FIG. 4A and 444 of FIG. 4B may be generated or determined empirically. In other implementations, correlation factor values 414 and 444 may be determined probabilistically based on, for example, occurrence rates (e.g., based on frequency at which a user visits a location, participates in an activity, etc.). In at least one implementation, correlation factor values 414 and 444 may be applied as weighting factors (or "weights") to modify relevancy values or other attribute values.

Figure 5:
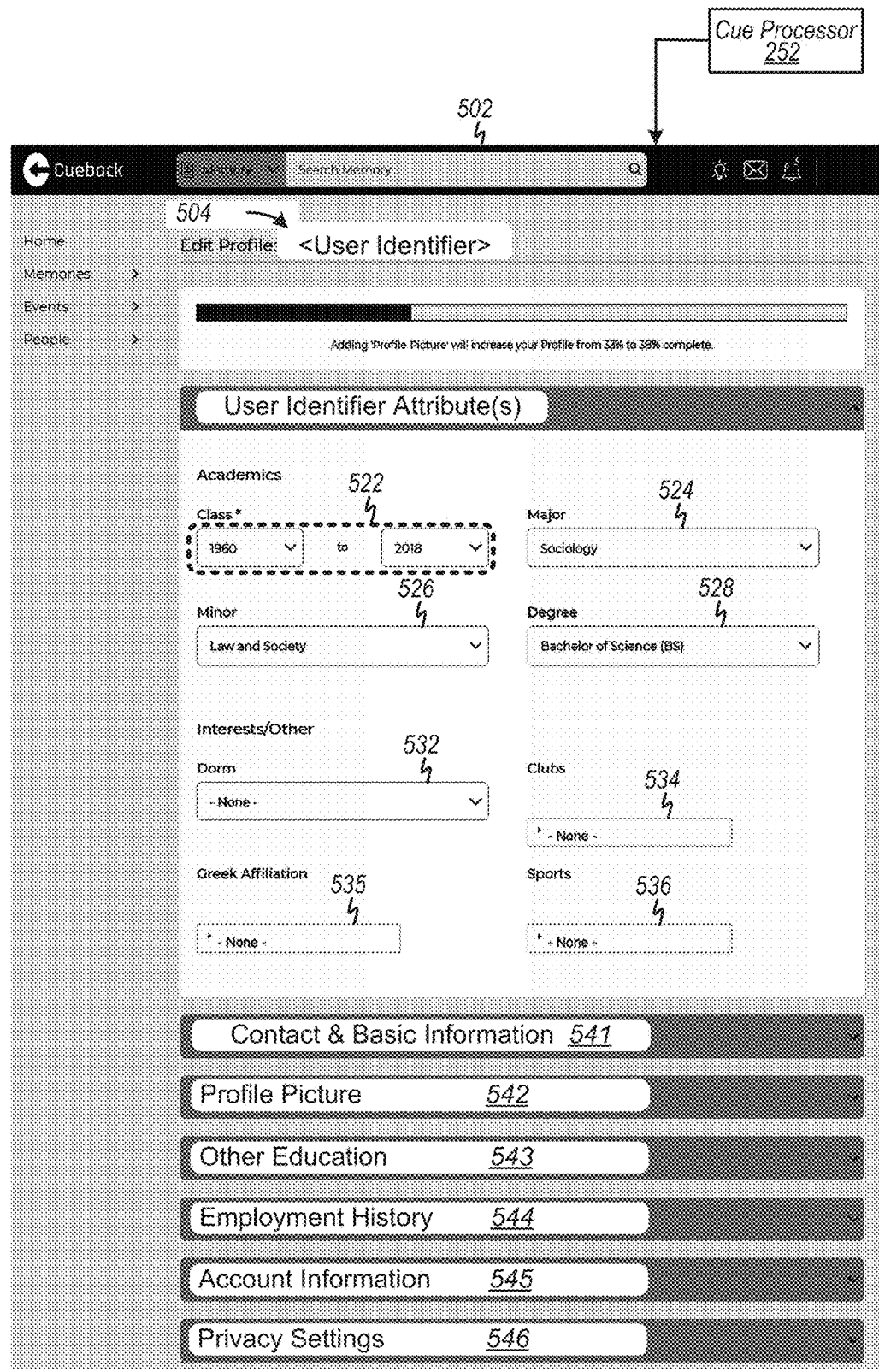
FIG. 5 is an example of a user interface to receive one or more prompts to identify one or more user attributes, according to some examples.

FIG. 5 is an example of a user interface to receive one or more prompts to identify one or more user attributes, according to some examples. Diagram 500 depicts a user interface 502 configured to exchange data with a cue processor 252, which, in turn, may be configured to store user-related attributes received into user interface in a user account data arrangement (not shown). User interface 502 includes of field 504 in which to accept data representing a user identifier, such as a name, user name, user account identifier, or the like. In the example shown, user interface 502 includes user inputs, as prompts, to identify user-related attributes relating to a user's college experience. User input 522 may be configured to receive data selecting a date range during which the user attended a college, user input 524 may be configured to identify data representing a degree (e.g., a major or a specific area of specialized education), user input 526 may be configured to identify data representing a degree (e.g., a minor or specific curriculum directed to a secondary or complementary area of education), and a user input 428 configured to receive data identifying a degree. Further, additional academic information may be identified, for example, via user input 532, which is configured to identify data representing a name of a dorm. Also, user input 534 may be configured to receive data representing one or more clubs, user input 535 may be configured to receive data representing a Greek affiliation (e.g., a fraternity or sorority), and user input 536 may be configured to receive data representing one or more sporting activities a user participated in during college.

User interface 502 may also include additional user inputs, such as user input 541 to receive data representing contact and basic information, user input 542 to receive data representing a profile picture of a user, user input 543 to receive data representing other educational information and user attributes, user input 544 to receive data representing employment and work history related data, user input 545 to receive data representing user account-related data information, and user input 546 to receive data representing privacy settings.

Figure 6:
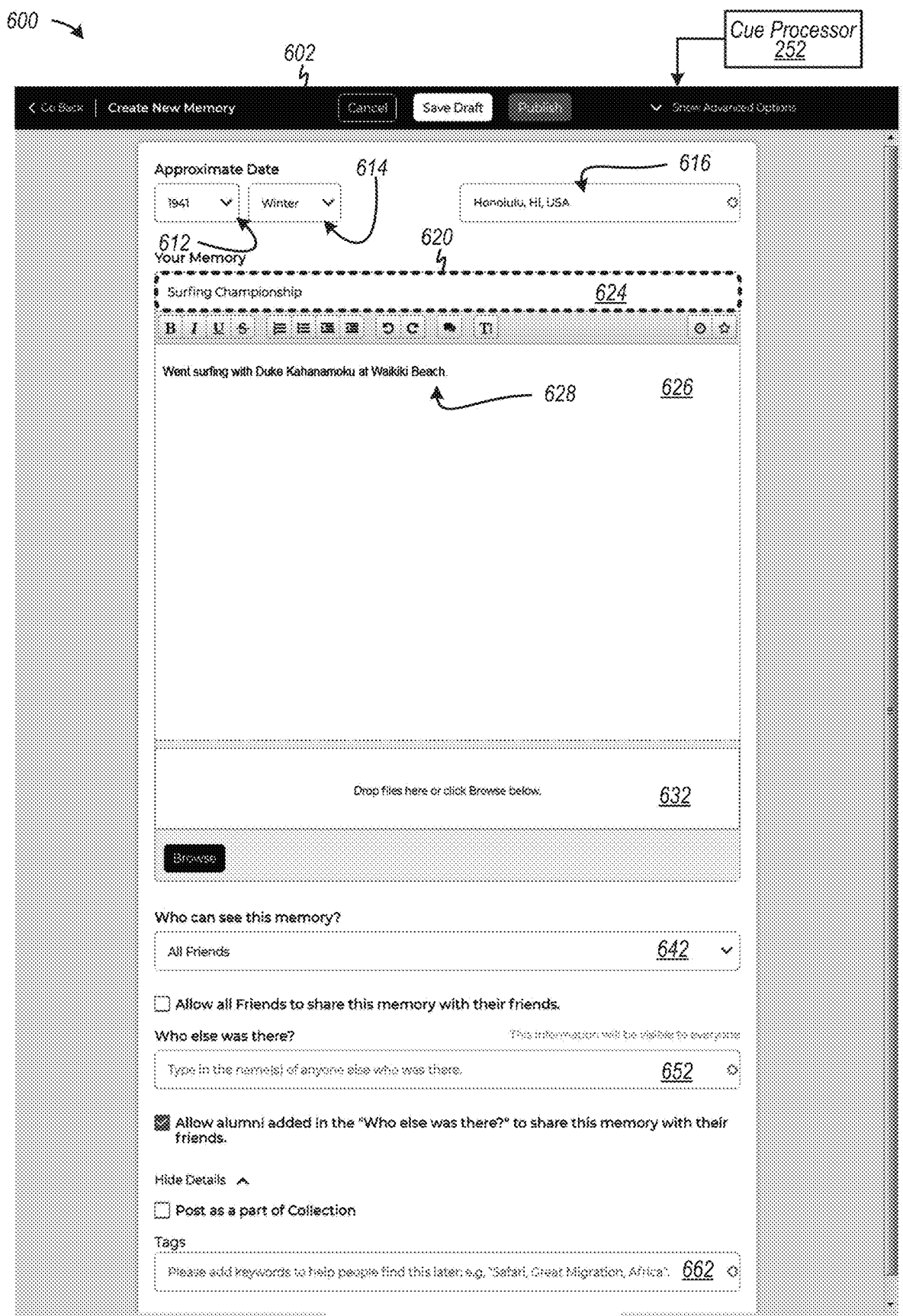
FIG. 6 is an example of a user interface to generate a recollection with which other users may collaborate, according to some examples.

FIG. 6 is an example of a user interface to generate a recollection with which other users may collaborate, according to some examples. Diagram 600 depicts a user interface 602 interface configured to exchange data with, for example, a cue processor 252, which may be configured to generate user inputs for user interface 602 as prompts. User inputs 612 and 614 may be configured to receive data to identify approximate time or duration of time. As shown, user input 612 may be configured to receive data representing a year (or any other date), and user input 614 may be configured to receive a "season" associated with a recollection should a user be uncertain of a particular month or day. User input 616 may be configured to receive data representing a geographic location at which a recollection occurred. Here, an activity "surfing championship" may be entered into field 624 of a recollection 620. User input 632 may be configured to receive content, such as images, audio files, or any other stimuli to provide context to evoke memories of, for example, any other use who may desire to collaborate on forming recollection collaboratively. A description 628 of a recollection may be entered into editor 626. Note, too, that cue processor 252 may be configured to capture text in description 628 as text-based "cues." Thus, "surfing," "Duke Kahanamoku," and "Waikiki" may be stored in a cue data model repository for predicting subsequent cues for presentation.

Further, user input 642 may be configured to restrict access, modification, or propagation of recollection 620 based on, for example, a type of collaborative user for which permission is granted. Here, all "friends" are granted access. User input 652 may be configured to receive data representing specific users that may be associated with recollection 620. User input 662 may be configured to receive data representing user-provided tags or metadata, which may be used for forming cues or prompts.

As shown, if a month or day is not known, a user can enter a season via user 614 (e.g., winter). A collaborative recollection engine (not shown) may be configured to automatically adjust for season changes based on hemispheric location. For example, if a user living in the U.S. forms a recollection 620 that happened in Australia in the summer of 1970, then when a user viewing it in a timeline may be presented a period of time including December, January, February which are the summer months in the southern hemisphere. Conversely, if the same U.S.-based user generates another recollection that occurred in the U.S. in the summer of 2011, then that memory will appear in the timeline during a period of time that includes June, July, and August, which are summer months in the northern hemisphere. Note that in some cases, user input 612 may be configured to receive a number representative of a decade should a user be uncertain of a year, whereby reference may be made to an early portion of a decade (e.g., early 1970s), a middle portion of a decade (e.g., mid-1970s), and a later portion of the decade (e.g., late 1970s).

Figure 7:
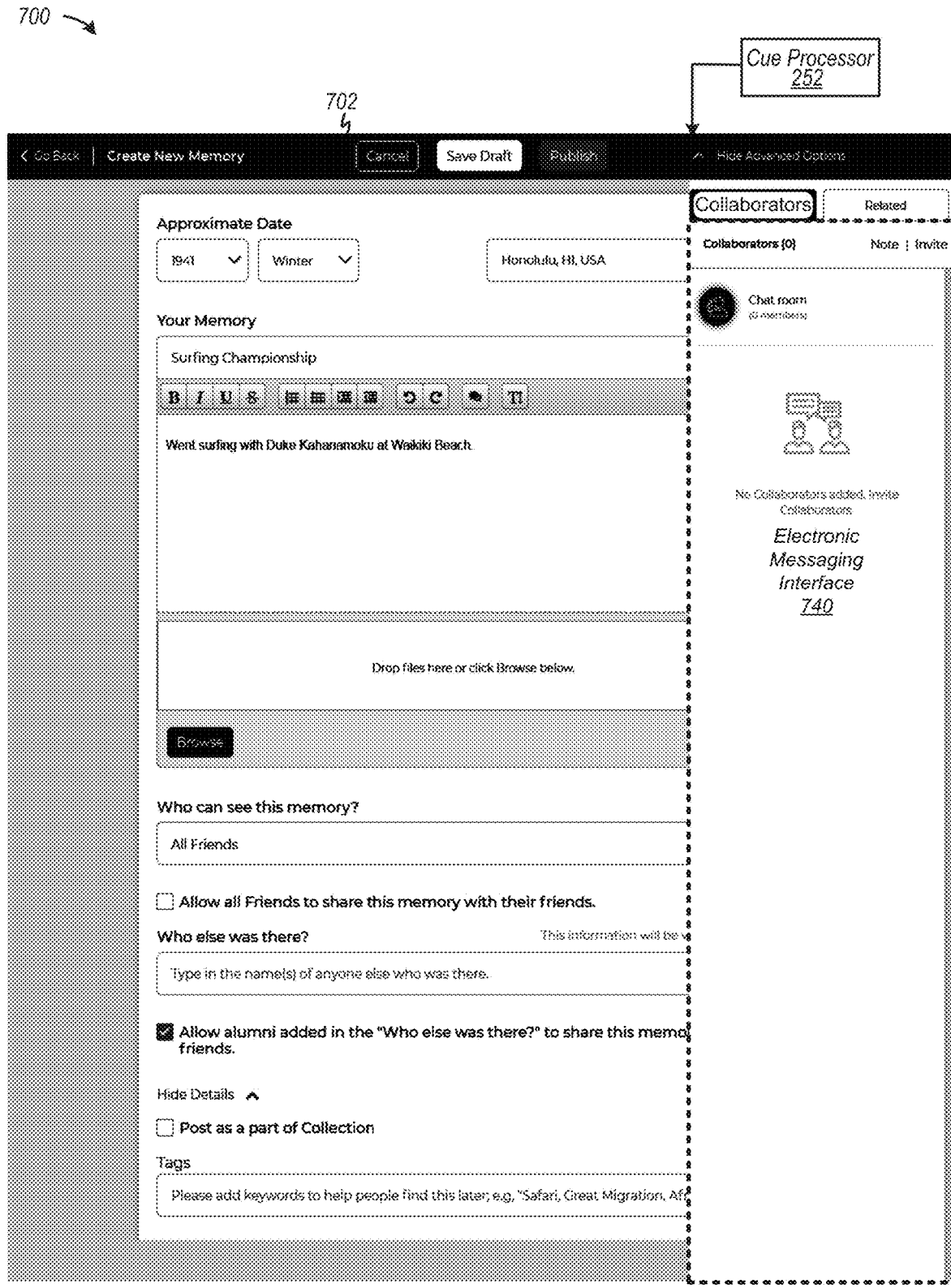
FIG. 7 is another example of a user interface to generate a recollection with which other users may collaborate, according to some examples.

FIG. 7 is another example of a user interface to generate a recollection with which other users may collaborate, according to some examples. Diagram 700 depicts a user interface 702 interface configured to exchange data with, for example, a cue processor 252, which may be configured to generate user inputs for user interface 702 as prompts. In this example, an electronic messaging interface 740 may be accessed to request information from other collaborative users in-situ (i.e., an electronic message communication channel may be established during presentation or contemporaneous with presentation of user interface 702, which is configured to form a recollection). In particular, a user forming a recollection titled "surfing championship," may wish to contact some other user or person in real-time (or nearly real-time) to receive immediate feedback or clarification based on another's experience or memory. In response, and other collaborative users may provide supplemental information via interface 740, which, in turn, may be added to supplement the recollection.

Figure 8:
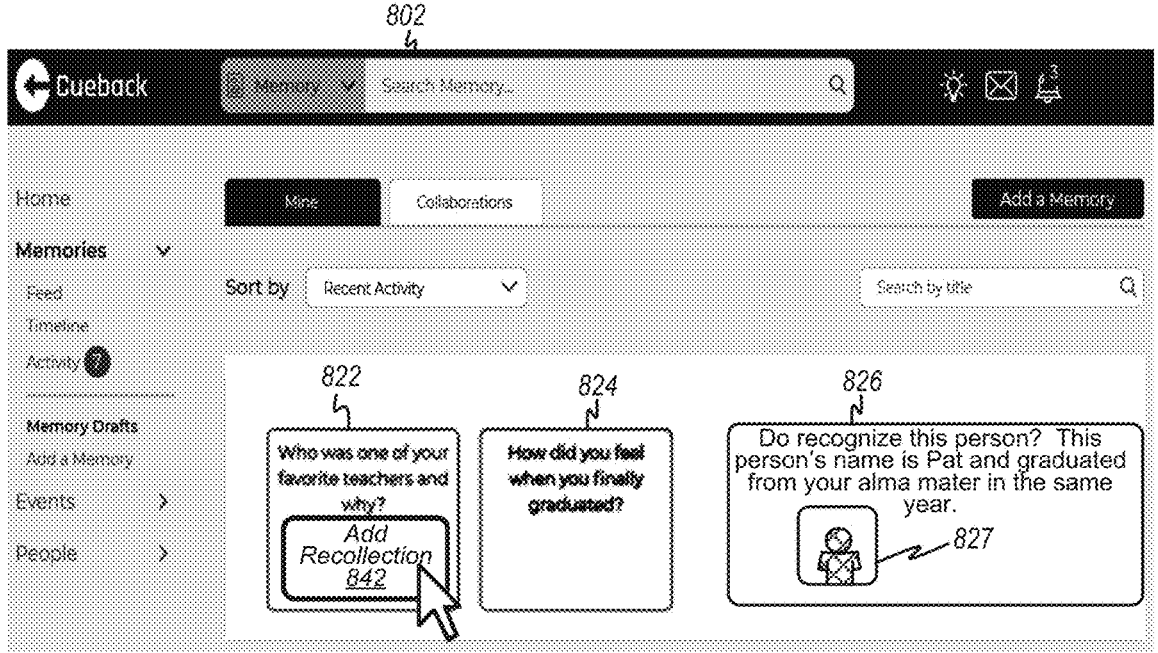
FIG. 8 is a diagram depicting examples of a prompt to identify attributes or evoke a memory, according to some examples.

FIG. 8 is a diagram depicting examples of a prompt to identify attributes or evoke a memory, according to some examples. Diagram 800 depicts a user interface 802 configured to present interactive user inputs to prompt entry of a particular attribute or to explore whether a user may be aware of, or otherwise subconsciously aware of (e.g., a forgotten memory), another user or an experience association with a location, activity, or the like. Prompt 822 may be configured to solicit information regarding a user's favorite teacher, which may be entered in response to activating user input 842 to add a recollection about that teacher. Prompt 824, if selected, may be configured to facilitate generation of a recollection of a user's experiences at or near graduation from an educational institution. Prompt 824 may be generated to include an image 827 as a cue, whereby prompt 824 and 827 may be based on cue data, such as cue data formed, generated, and maintained in cue data model repository 304 of FIG. 3. In other examples, image 827 may be replaced by any other content media is a cue.

In some cases, a prompt may be automatically customized to become more applicable to the user. For example, if a user A lived in "Fremont" dorm (as identified via user input 532 of FIG. 5) and user B lived in "Lassen" dorm, user A might receive a prompt that says "Who was your first friend you made in Fremont?" However, user B might receive a prompt that says "Who was your first friend you made in Lassen?" Rather than image 827, a music prompt may be personalized based on demographics to, for example, serve up Beyoncé's "Crazy in Love" to 30 year olds, Van Halen's "When It's Love" to 45 year olds, and Marvin Gaye's "Let's Get It On" to 60 year olds. Further, prompts may also be personalized based on preferences. For example, a prompt or cue may include presentation of Dave Brubeck's "Take Five" to users who are interested in Jazz. Prompts may be displayed or altered based on each user's actions within a collaborative recollection system (or other third party or external computing platform system). For example, if user A has "friended" or otherwise interacted with another user (user B), a prompt may be generated to ask user A "How did you meet user B?" In another example, a prompt may be displayed based on user's interactions with a collaborative recollection system. Hence, if a user signs up for a reunion last year, they may be prompted "What do you remember best from last year's reunion?" at a later point in time.

Further, cue generation may be based on attribute values and changes in attribute values. For example, in addition to being able to select different genres (including different genres over time, such as selecting pop music during teenage years, classical music during adults years), a display of cues may be facilitated by other attributes, such as gender and age differences. Selections regarding genre preferences and attributes may be imported from an external source or computing platform (e.g., Spotify™ and the like). For example, there may be differences in popularity of, or preference for, a song based on birth year. For males, favorite songs may relate to ages around 14 years old, which may be a period in which their adult musical preferences may be determined during ages 13 to 16. For females, favorite songs may relate to ages around 13 year old, which may be a period in which their adult musical preferences may be determined during ages 11 to 14.

Figure 9:
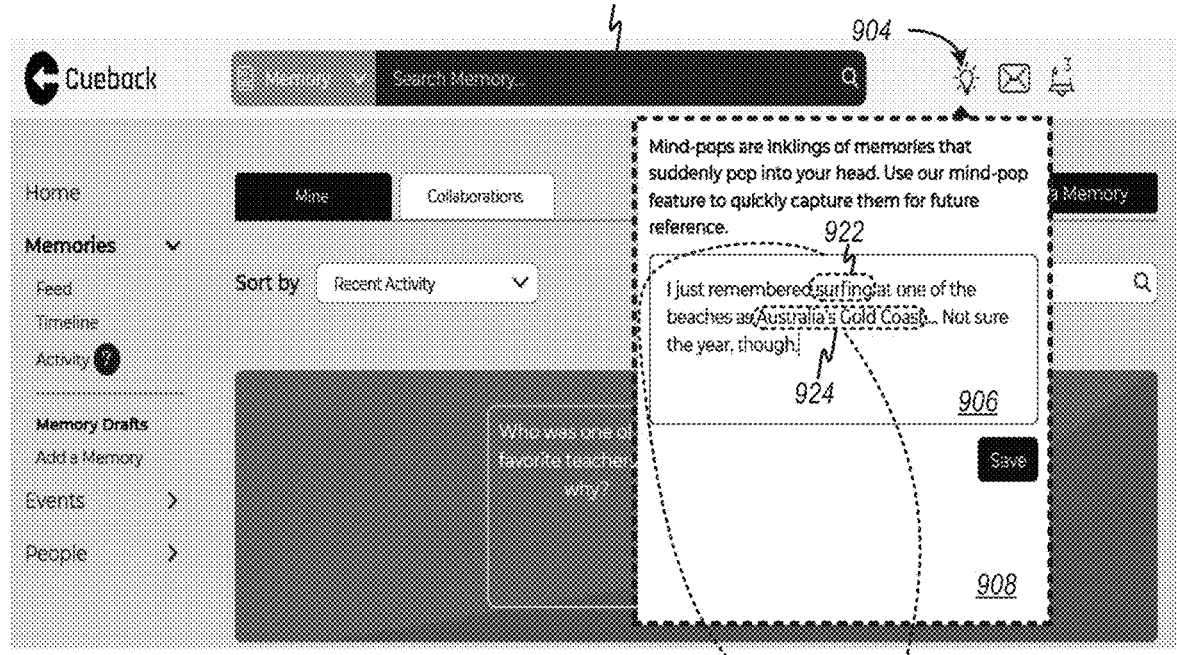
FIG. 9 is a diagram depicting an example of in-situ entry of a portion of a recollection or memory during generation of the recollection for subsequent cue generation, according to some examples.

FIG. 9 is a diagram depicting an example of in-situ entry of a portion of a recollection or memory during generation of the recollection for subsequent cue generation, according to some examples. Diagram 900 includes a user interface 902 having a user input 904, which is configured to generate a "mind-pop" interface 908. In some examples, mind-pop interface 908 may be used to form a basis for memory creation similar to recollection creation described herein, such as described in FIG. 6. As shown, a user may enter portions of a memory or recollection in mind-pop editor 906, whereby a cue processor 152 of FIG. 1 may be configured to extract or identify key terms, such as term ("surfing") 922 and term ("Australia's Gold Coast") 924 for identifying, for example, activity attributes based on term 922 and location attributes based on term 924. Cue processor 152 may later implement either term 922 or term 924 in forming a cue or prompt. Terms 922 and 924 may be included in cue data, such as cue data formed, generated, and maintained in cue data model repository 304 of FIG. 3

Figure 10:
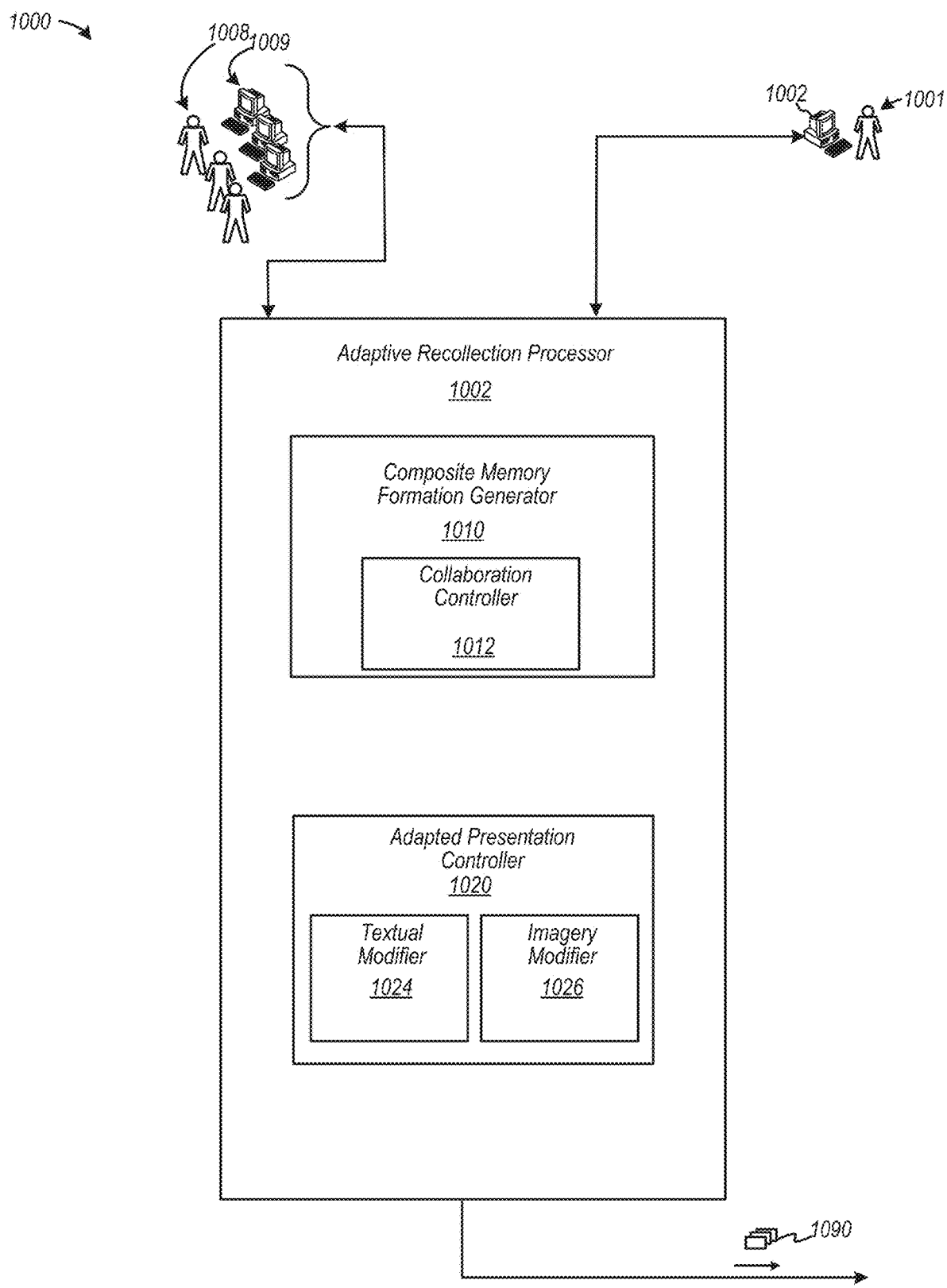
FIG. 10 is a diagram depicting an example of an adaptive recollection processor configured to adapt one or more recollections or memories, according to some examples.

FIG. 10 is a diagram depicting an example of an adaptive recollection processor configured to adapt one or more recollections or memories, according to some examples. Diagram 1000 depicts an adaptive recollection processor 1002 including a composite memory formation generator 1010 configured to form recollections collaboratively (e.g., recollections or memories having multiple user inputs or recollections fused or otherwise combined together), and an adapted presentation controller 1020 configured to adapt presentation of a recollection to form versions suitable for specific audience or class of reader. Adaptive recollection processor 1002 may be configured to access recollections or user feedback via computing device 1002 from user 1001, as well as via computing devices 1009 from users 1008. Adaptive recollection processor 1002 may be configured to generate data 1090, which may include data representing an adapted recollection tailored for a particular reader, such as a parent or child. One or more elements depicted in diagram 1000 of FIG. 10 may include structures and/or functions as similarly-named or similarly-numbered elements depicted in other drawings, or as otherwise described herein, in accordance with one or more examples.

Composite memory formation generator 1010 may be configured to form one or more recollections for user 1001 through collaboration with users 1008. Hence, memory recall may be facilitated based on information provided by other users 1008. To illustrate, consider that personal memories may involve family or close friends as a subset of users 1008. Thus, user 1001 may invite these people to help him or her recall different aspects of a recollection or memory, or to help give the recollection or memory more "details" by offering supplemental details or by offering their own perspective of a shared experience. Collaboration controller 1012 may be configured to control the collaboration process by identifying and selecting the subset of users 1008 who may be optimal in providing effective information to enrich a memory of user 1001, thereby forming a composite memory (i.e., based on recollections of multiple persons that may be interwoven to form a monolithic memory or recollection, or presented separately as per the Rashomon effect). In some cases, collaboration controller 1012 may be configured to suggest potential collaborators, if two or more users, unbeknownst to each other, were at a common location at the same time. Thus, there may be relatively high likelihood that at least two users may share some common experiences, whether it was weather or any other condition or attribute that may overlap in time and/or geographic location, and the like.

Adapted presentation controller 1020 may be configured to adapt a recollection to suit an audience or particular class of readers. In some examples, one or more portions of a textual description of a recollection may be redacted (e.g., via use of blackened lines obscuring offending language or text identified for removal). In at least one case, redaction may be facilitated by concatenating text surround an offending word identified to be redacted (e.g., the text "the quick brown fox" may undergo redaction to remove "quick" and concatenating "the" and "brown fox" to form a resultant text "the brown fox"). According to various examples, textual modifier 1024 may be configured to modify one or more portions of a textual description of a recollection (e.g., automatically) to delete or replace words with less offensive or more appropriate synonyms. According to various examples, imagery modifier 1026 may be configured to modify one or more portions of an image (e.g., automatically) used to accompany a recollection to delete or replace imagery with less offensive or more appropriate graphical features (e.g., including a digitized portion to blur out an offending feature of an image).

Figure 11:
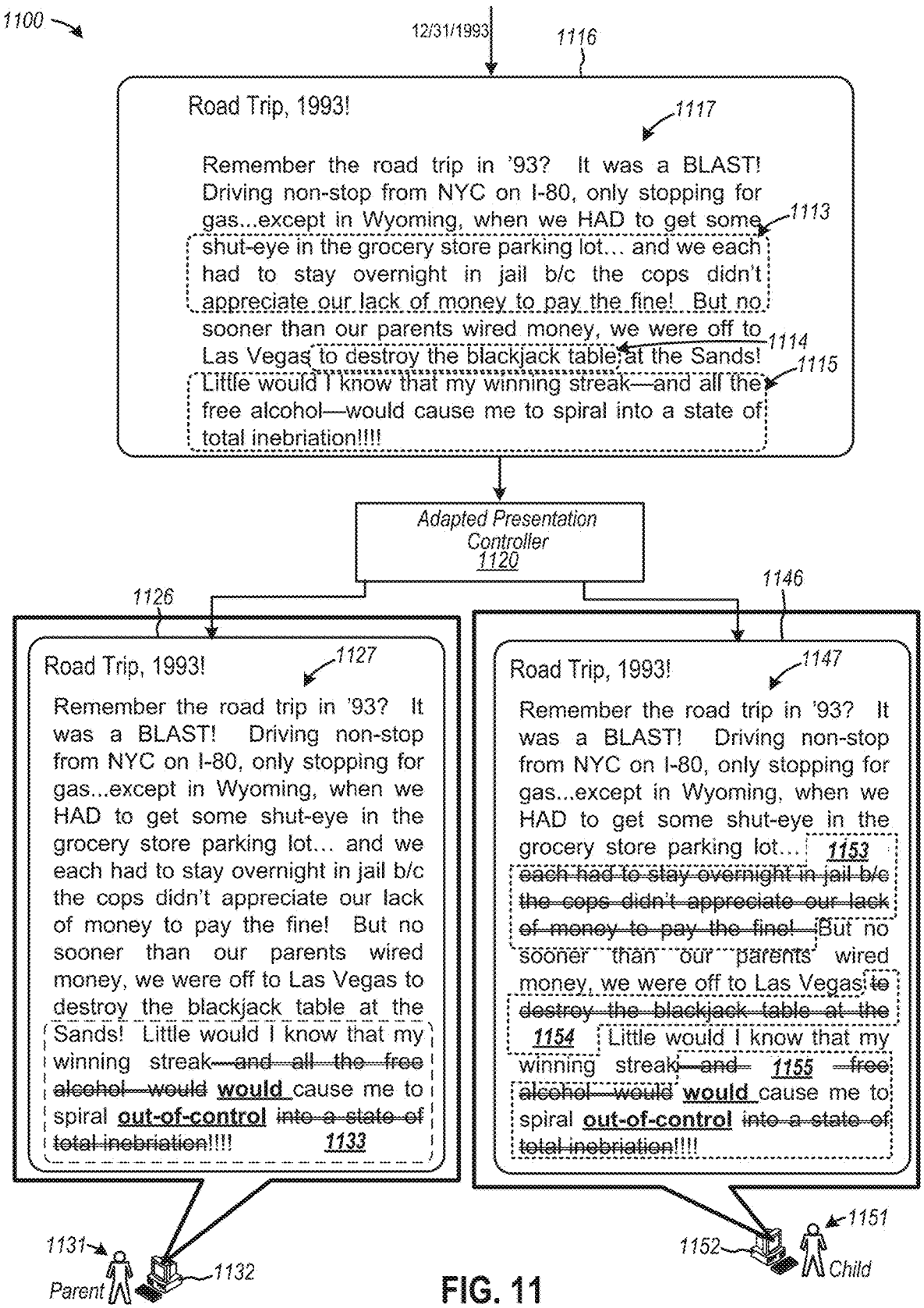
FIG. 11 is a diagram depicting an example of an adapted presentation controller configured to adapt a textual description of a recollection, according to some examples.

FIG. 11 is a diagram depicting an example of an adapted presentation controller configured to adapt a textual description of a recollection, according to some examples. Diagram 1100 includes an adapted presentation controller 1120 configured to receive a raw textual description 1117 of a recollection 1116, which includes a text portion 1113 describing a "night in jail" during youthful indiscretions, a text portion 1114 describing a user's participation in gambling, and a text portion 1115 describing an incident in which the user abused or unwisely consumed large amounts of alcohol. If one potential reader is a parent 1131 at computing device 1132, then adaptive presentation controller 1120 may form a first version of textual description 1126 adapting text 1127 to exclude or otherwise modify the abuse of alcohol with a milder or tamer text portion 1133. In some examples, a controller can be configured to highlight certain sensitive words (e.g., "alcohol," "beer," "marijuana," etc.) so that text is automatically highlighted as a means to prompt a user whether they want to create different versions for different audiences. In some cases, such words are automatically identified and either masked, removed, or substituted with a more innocuous word.

Note that the strike-through text indicates text to be removed and underlined text indicates text to be added, whereby the text may be displayed without formatting. Thus, parent 1131 may not receive visual indications that the parent is reading a modified version. If another potential reader is a child 1151 at computing device 1152, then adaptive presentation controller 1120 may form a second version of textual description 1146 adapting text 1147 to exclude or otherwise modify the abuse of alcohol with a milder or tamer text portion 1155. Further, a user may wish to remove references to the "night in jail" by removing text portion 1153. References to gambling may also be removed by striking text portion 1154. As before, the strike-through text indicates text to be removed and underlined text indicates text to be added, whereby the text may be displayed without formatting. Thus, child 1151 may not receive visual indications that the child is reading a modified version.

Figure 12:
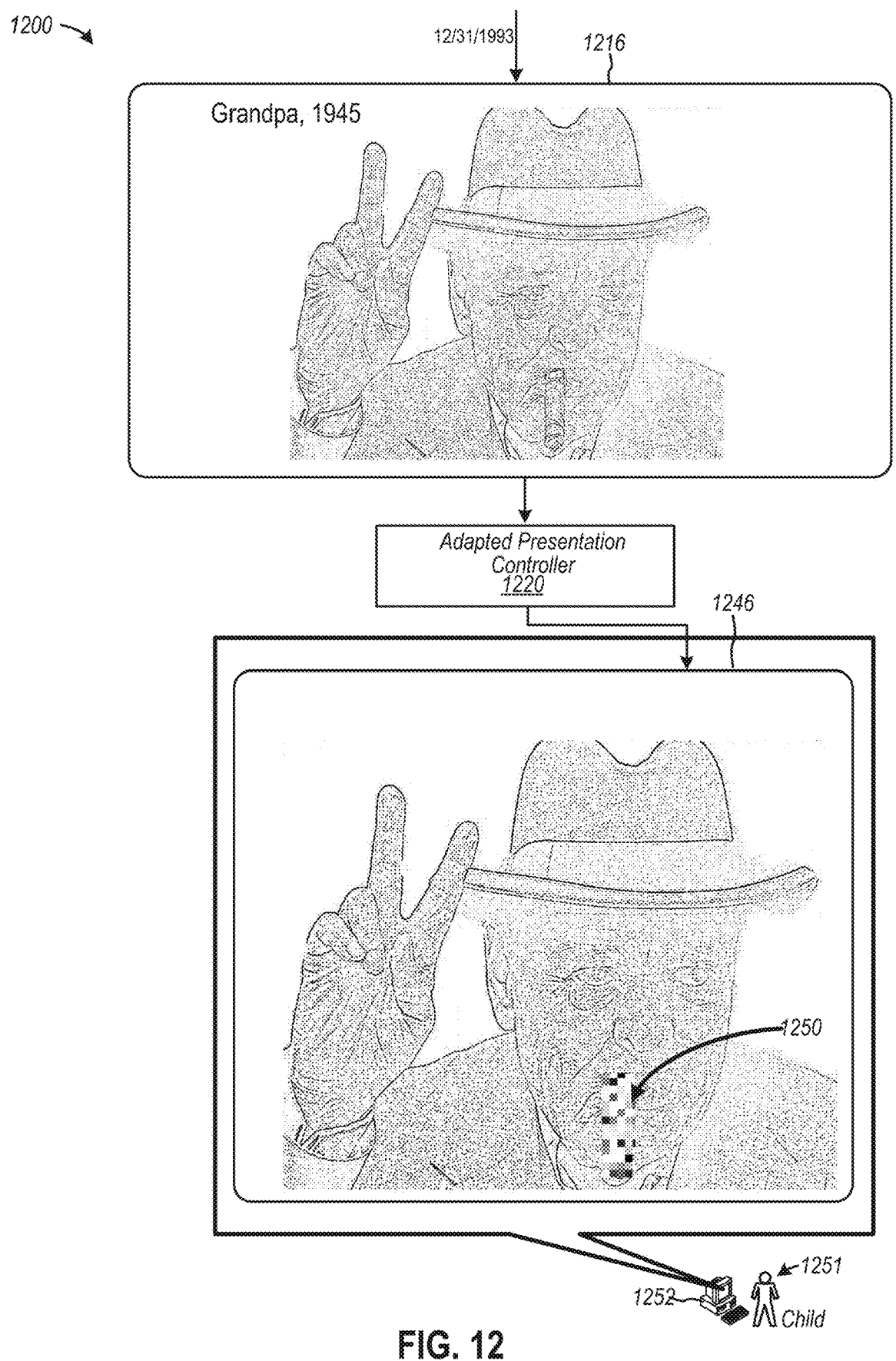
FIG. 12 is a diagram depicting another example of an adapted presentation controller configured to adapt an image associated with a recollection, according to some examples.

FIG. 12 is a diagram depicting an example of an adapted presentation controller configured to adapt an image associated with a recollection, according to some examples. Diagram 1200 includes an adapted presentation controller 1220 configured to receive a raw image 1216 depicting "grandpa smoking a cigar." Should a user not wish to depict grandpa smoking to avoid a child from being influenced by tobacco, adapted presentation controller 1220 may be configured to form a modified image 1246 by, for example, pixelating the cigar feature to form a pixelated portion 1250, which masks the offending cigar. In some examples, image processing may form simulated facial features to replace portion 1250 with a simulated lip and portion of chin that was originally occluded by the cigar. Thus, child 1251 need not be exposed to tobacco products when viewing grandpa's photo at computing device 1252.

Figure 13:
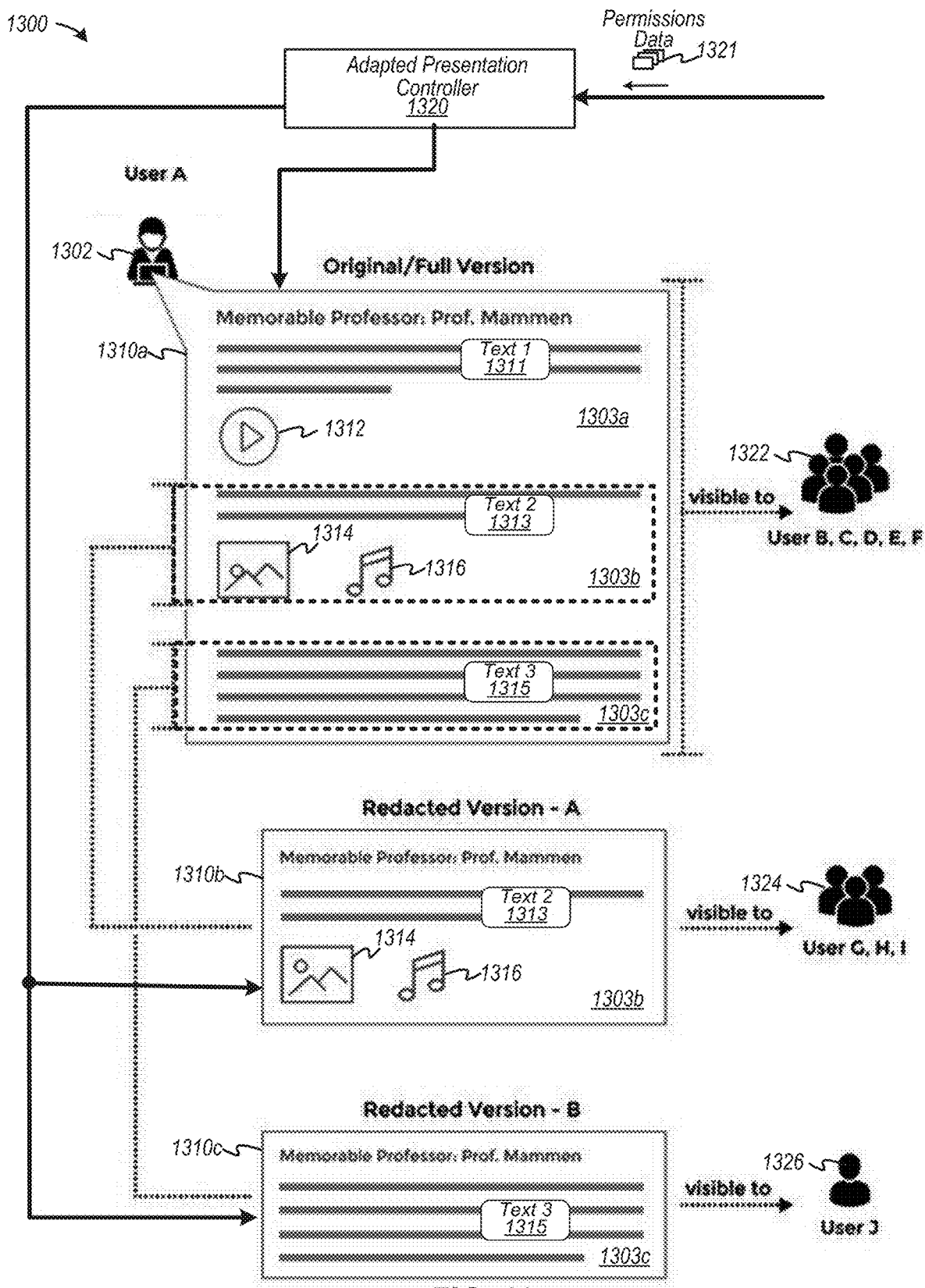
FIG. 13 is a diagram depicting another example of an adapted presentation controller configured to adapt a textual description of a recollection, according to some examples.

FIG. 13 is a diagram depicting another example of an adapted presentation controller configured to adapt a textual description of a recollection, according to some examples. Diagram 1300 includes an adapted presentation controller 1320 configured to receive data to form one or more various adapted versions of a recollection responsive to, for example, permissions data 1321 that may define which levels or types of content (or portions of a recollection) may be viewable by another user. In the example shown, a user 1302 initiates execution of instructions via a computing device to form a recollection 1310a including a number of portions that may associated with various levels of accessibility as a function, for example, on access permissions granted to other users. Here, recollection 1310a includes a first portion 1303a including text ("Text 1") 1311 and a video 1312, a second portion 1303b including text ("Text 2") 1313, an image 1314, and an audio file 1316, and a third portion 1303c including text ("Text 3") 1315. One or more elements depicted in diagram 1300 of FIG. 13 may include structures and/or functions as similarly-named or similarly-numbered elements depicted in other drawings, or as otherwise described herein, in accordance with one or more examples.

In this example, users ("B, C, D, E, and F") 1322 may be associated with permissions data 1321 that provides authorization to each of these users to view or access recollection portions 1303a, 1303b, and 1303c. Further, users B, C, D, E, and F may also be authorized to respond to each recollection portions 1303a, 1303b, and 1303c (e.g., via generating a response of comment) or by modifying any of content in recollection portions 1303a, 1303b, and 1303c to form collaborative recollection data for enhancing recollection 1310a. Users ("G, H, and I") 1324 may be associated with another subset of permissions data 1321 that may provide authorization to each of these users 1324 to view or access recollection portion 1303b as an adapted recollection 1310b configured for permissions given to users 1324. In one example, users 1324 may be authorized to view or access recollection portion 1303b to modify or supplement text 1313, image 1314, and audio file 1316 to form collaborative recollection data for enhancing recollection portion 1310b. Further, user ("J") 1326 may be associated with yet another subset of permissions data 1321 that may provide authorization to user 1326 to view or access recollection portion 1303c as an adapted recollection 1310c, which redacts portions 1303a and 1303b. In one example, user 1326 may be authorized to respond to recollection portion 1303c (e.g., via generating a response of comment) or by modifying any of content in recollection portion 1303c to form collaborative recollection data for enhancing recollection portion 1310c.

According to some examples, one or more users may be able to identify each user who has permission to view each piece of content (or portion of a recollection) incorporated into a recollection, as well anyone who potentially may be a collaborator as they may have permission to access a recollection. Each element of content (including text, images and other associated content in a recollection) may be selectably presented or redacted based on viewing access rights. For example, viewing rights can be restricted to an originator, a group of named individuals, or other groups of individuals (e.g., high school friends, drinking buddies, golf team, university-based relationships, etc.), or public. Specific users may be excluded from receiving access to one or more portions of a recollection. In some cases, an originator of a recollection may have an option to choose to show those users who contributed to specific portions of a collaborative or combined recollection, or to display the recollection as a single joint memory with little to no distinction as to which user contribute to which portion of the recollection, according to some embodiments. An originator may publish a recollection, with collaborative users having access to edit the recollection, both before and after the recollection has been published. In case of the latter, the originator may approve or rejects edits and republish the recollection.

Figure 14:
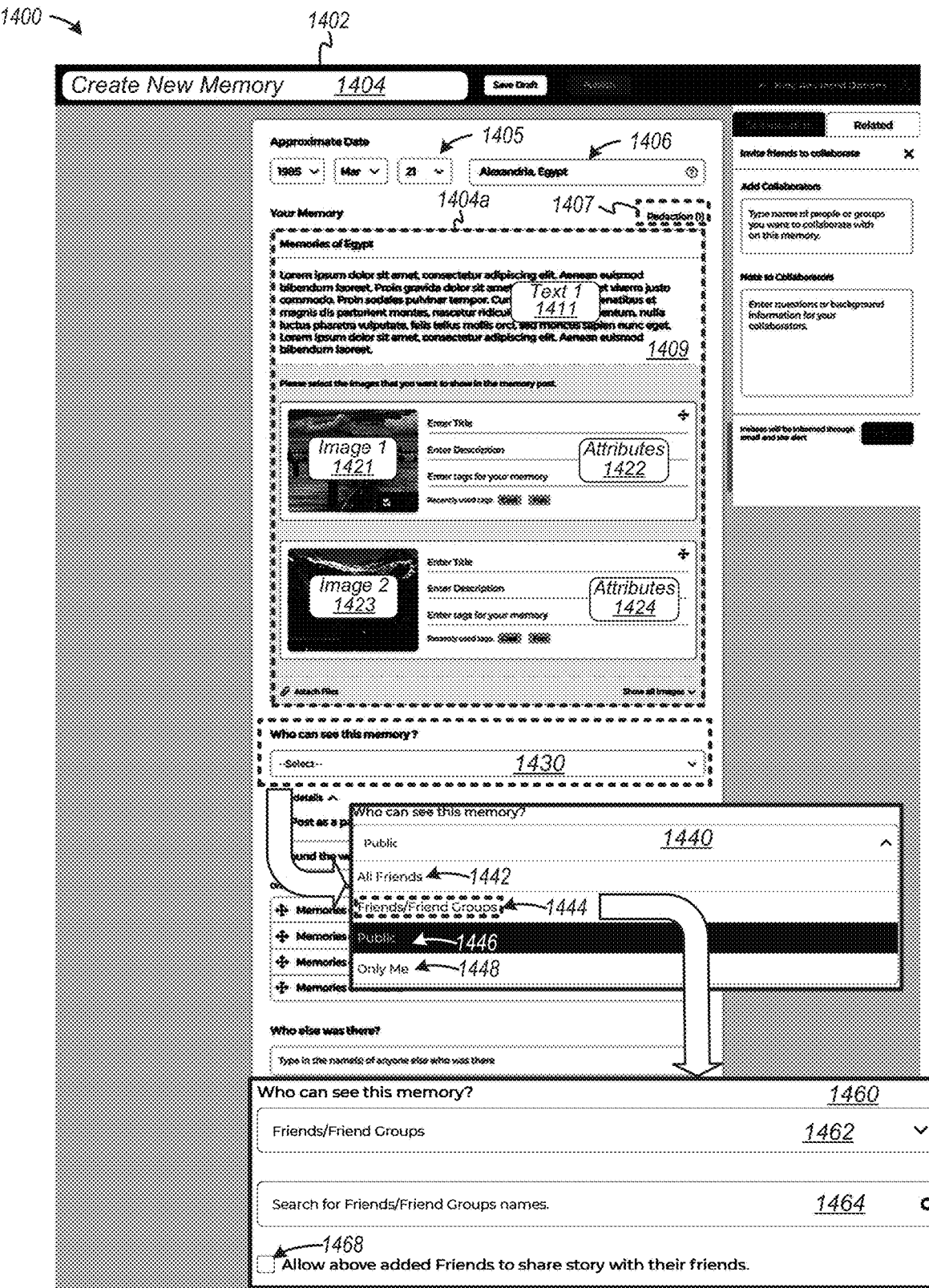
FIG. 14 is a diagram depicting a user interface configured to set permissions for accessing or modifying a recollection formed in association with the user interface, according to some examples.

FIG. 14 is a diagram depicting a user interface configured to set permissions for accessing or modifying a recollection formed in association with the user interface, according to some examples. Diagram 1400 is depicted as including a user interface 1402 configured to generate a new memory or recollection 1404 user interface 1402 includes a user input 1405 to receive data representing an approximate date, and a user input 1406 to receive data representing a location associated with recollection 1404. In one example, an editor 1409 in user interface portion 1404a may be configured to receive text ("Text 1") 1411 to form a recollection relating to travel to Egypt. Image ("1") 1421 and image ("2") 1423 and respective attributes 1422 and 1424 may be associated with the recollection in user interface portion 1404a. Hence, images of 1421 and 1423 and attributes 1422 and 1424 may be included as cues for other users so as to evoke memories in forming collaborative recollections.

User interface 1402 also may include a user input 1430 to define permissions for one or more users to define access, read, or write privileges for recollection 1404, as well as defining which contributions another collaborative user may be view by subsets of other collaborative users. In one example, an interface portion 1440 may be presented, responsive to activation of a user input 1430. User input 1442 may be configured to receive data representing permissions to provide access to "all friends," whereas user input 1444 may be configured to receive data representing permissions to provide access to one or more friends, or one or more groups of friends. User input 1446 may be configured to receive data indicating a recollection (or portions thereof) may be accessible publicly (e.g., by any user). User input 1448 may be configured to receive data indicating a recollection (or one or more portions thereof) may be private or accessible by a user.

Responsive to activation of user input 1444, another interface portion 1460 may be presented, at least in accordance with at least one example. In interface portion 1460, user input 1462 may be configured to receive data defining which user (e.g., which friend) may access a recollection (or one or more portions thereof). Also, user input 1462 may be configured to receive data defining which group of users may access the recollection. User input 1464 may be configured to receive text to perform a search of a repository associated with a collaborative recollection engine to identify one or more other users (and associated other user accounts) that may be configured to view one or more portions of a recollection.

According to various examples, one or more security algorithms may be implemented to restrict access and bolster privacy of one or more recollections of any number of users. In one example, user input 1468, if selected, may enable propagation or "onward sharing" of a recollection or a portion thereof as a function of collaborative user's access privileges. For example, if unchecked, user input 1468 is configured to generate a data signal that prevents sharing or propagation a recollection to any user other than those defined in user interface portions 1440 and 1460.

In some cases, security of redacted data and private content may be enforced using blockchain technology. As such, private content may include content that may or may not be shared to one or more subsets of the users. In at least one example, each user may be associated with a personal unique identifier that may have a cryptographic hash applied to it. The hash value then may be added onto, or incorporated into, a blockchain, whereby the hash value may be used to confirm the identity of any user requesting access. In at least one example, personal information (e.g., a username and passcode) need not be required to verify a user's identity. Accordance with various implementations of forming a blockchain enables decentralized verification of user permissions to access or modify a recollection.

FIG. 15 is a diagram depicting a user interface configured to form an adapted recollection, according to some examples. Diagram 1500 includes a user interface 1502 including user inputs configured to generate a data signal, responsive to selection of a user input, to redact one or more portions of a recollection to form an adapted recollection. User interface 1502 presents a recollection 1510 and one or more other variations of recollection 1510 in windows 1511 and 1513. According to various examples, an adaptive recollection processor may automatically determine redacted versions of recollection 1510 in windows 1511 and 1513. Or, a user may enter redacted text in windows 1511 and 1513 to form redacted versions of recollection 1510. Selection of either a first redacted version in window 1511 or a second redacted version in window 1513 may be activated via selection of user inputs 1530 and 1532, respectively. Further, another interface portion 1540 may present a user input 1542 to identify which one or more users may be presented with the selected redacted version.

FIG. 16 is a diagram of an adaptive recollection processor configured to adapt a recollection as a function of permissions by collaborative users to access the recollection, according to some examples. Diagram 1600 depicts a collaborative recollection engine 1650 including an adaptive recollection processor 1654 coupled to a repository 1656, which is configured to store permission data arrangements 1610. In this example, a user ("Eric") 1601a is a creator or originator of a recollection 1602 as presented in a display of a computing device 1602a. User 1601a may be configured to set permissions for portion 1604 of recollection 1602 as "public." As such, users (e.g., any user associated with collaborative recollection engine 1650) may access portion 1604. User 1601a also may be configured to set permissions for portion 1606 of recollection 1602 to limit access to "football club members." As such, users associated with a football club may view portions 1606 and 1604, which is publicly accessible. Further, user 1601a may be configured to set permissions for portion 1608 of recollection 1602 to limit access to "tennis club members." As such, users associated with a tennis club may view portions 1608 and 1604, which is publicly accessible. Members of both the tennis and football clubs may access each portion 1604, 1606, and 1608.

Next, consider that other collaborative users may have different permissions. Diagram 1600 depicts collaborative user ("Ringo") 1601b interacting via computing device 1602b and network 1603 with collaborative recollection engine 1650 to access one or more portions of recollection 1602, and also depicts collaborative user ("George") 1601c interacting via computing device 1602c and network 1603 with collaborative recollection engine 1650 to access one or more portions of recollection 1602. Collaborative user ("Paul") 1601d and collaborative user ("John") 1601e may interact via computing devices 1602d and 1602e, respectively, to access one or more portions of recollection 1602 based on permissions stored in, for example, a permission data arrangement 1610. In this example, user 1601a may share one or more portions of recollection 1602 with one or more of users 1601b to 1601e. Note further that in this example, user ("Ringo") 1601b is a tennis club member, user ("George") 1601c is a football club member, user ("Paul") 1601d is both a tennis club member and a football club member, and user ("John") 1601e is not a member of either a tennis club or a football club.

User ("Eric") 1601a, as originator, has access to view and modify all portions 1604, 1606, and 1608. Further to the example shown, consider that user ("Eric") 1601a restricts visibility or access of portion 1606 to football club members and restricts visibility or access of portion 1608 to tennis club members. Permission data arrangement 1610 includes an "X" in row 1612 for each user Eric 1622, Ringo 1624, George 1625, Paul 1626, and John 1620 to enable access to publicly available portion 1604. In row 1614, an "X" for user Ringo 1624 and user Paul 1626 indicate these users are members of a tennis club, and, thus have access to portion 1608. With null values 1621 in row 1614 for user George 1625 and user John 1628, adaptive recollection processor 1654 may be configured to redact portion 1608 from access. In row 1616, an "X" for user George 1625 and user Paul 1626 indicate these users are members of a football club, and, thus have access to portion 1606. With null values 1621 in row 1616 for user Ringo 1624 and user John 1628, adaptive recollection processor 1654 may be configured to redact portion 1606 from access. In view of the foregoing, user Paul 1601d may have access to portions 1604, 1606, and 1608 based on permissions set forth in data arrangements 1610, user Ringo 1601b may have access to portions 1604 and 1608 (i.e., portion 1606 is redacted), user George 1601c may have access to portions 1604 and 1606 (i.e., portion 1608 is redacted), and user John 1601e may have access to portion 1604 (i.e., portions 1606 and 1608 are redacted).

According to various examples, adaptive recollection processor 1654 may be configured to govern application of contributions by collaborative users 1601b to 1601e as a function, for example, on permissions set forth by user 1601a, which may configure data stored in permissions data arrangement 1610. To illustrate, consider that user George 1601c, who is a public member and a football club member, generates data for modifying recollection 1602 (e.g., via an electronic comment message). For example, user George 1601c may transmit comment "I agree; great band," as comment data 1634, in response to portions 1604 and 1606. As user Eric 1601a is an originator and user Paul 1601d is also a football member, both users 1601a and 1601d may access or view comment data 1634, whereas users Ringo 1601b and John 1601e may not access or view comment data 1634. As another example, user John 1601e may transmit comment "They had a fantastic singer," as comment data 1638, in response to portion 1604. As user John 1601e may view public portion 1604, each user 1601a to 1601d having public access may access or view comment data 1638. In yet another example, user Paul 1601d may transmit comment "And the bass player was awesome," as comment data 1636, in response to portions 1604, 1606, and 1608. As user Eric 1601a and user Paul 1601d are members of both a tennis club and a football club, then comment data 1636 may have its access limited to user Eric 1601*a* and user Paul 1601*d* (and thus redacted for other users).

According to one example, user Eric 1601*a*, as originator of redacted content, may be configured to toggle through a various versions, including adapted recollections that present one or more portions 1604 to 1608. User 1601*a* may also be able to determine which of users 1601*b* to 1601*e* may be able access a specific version of the content. In some examples, a recipient user may belong to one or more circles or groups of users that have different redacted versions. So a user 1601*e* may have access limited to view a version of recollection 1602 that corresponds to public portions 1604 of a recollection (e.g., a version having the most redacted content, such as redacted portions 1606 and 1608, for which any of the circles that user 1601*e* is a member and has access rights to view). In some cases, a user, such as user 1601*e*, may not be able to access comments by other users are associated with less redacted (more inclusive) versions, such as users 1601*b* and 1601*c*, both of which have access to at least two portions of portions 1604 to 1608. Logic in adaptive recollection processor 1654 may be configured to prevent users from inferring from other comments that they have received a redacted version. For example, users John, Paul, George and Ringo view one version and need not infer or detect whether each views a redacted or modified version. According to at least on example, a user may choose to filter and review any recollection that is accessible to the public, or another group of viewers, or an individual to check, for example, that specific content, or certain types of content, such as inappropriate content, is not viewable by the public generally, or by a specific group of viewers, or by a specific individual.

Figure 17:
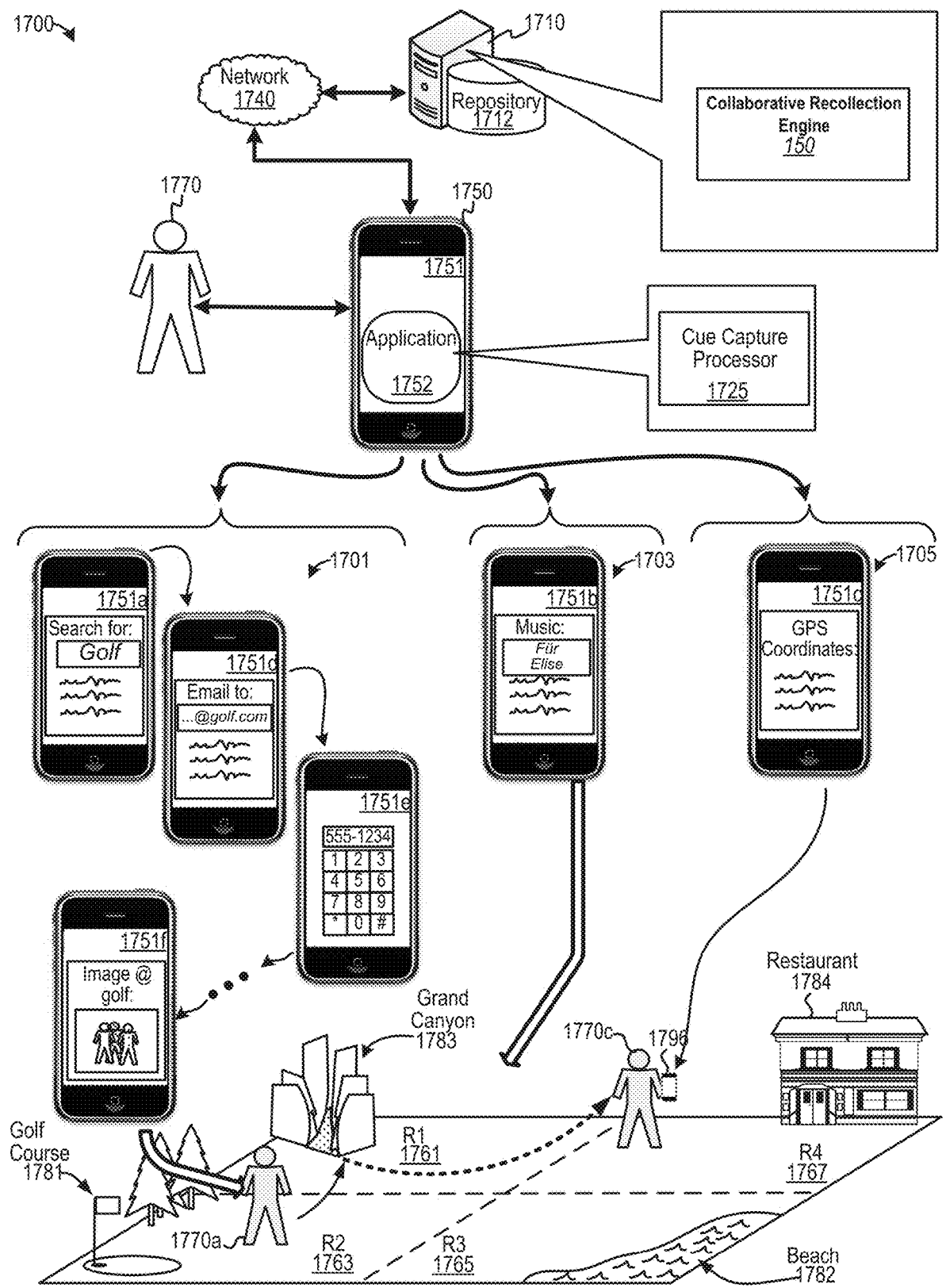
FIG. 17 is a diagram depicting a mobile computing device implementing an application configured to perform data logging to generate subsequent cues, according to some examples.

FIG. 17 is a diagram depicting a mobile computing device implementing an application configured to perform data logging to generate subsequent cues, according to some examples. Diagram 1700 includes a cue capture processor 1725, or a portion thereof, disposed in an application ("app") 1752 implemented in a mobile computing device 1750, which includes an interface (e.g., a user interface 1751). Cue capture processor 1725 may be configured to detect interactions with interface 1751, for example, by inputs provided by user 1770. Further, cue capture processor 1725 may be configured to characterize an interaction as an interaction type, which, in turn, may be used to extract data for use as a cue or prompt. Examples of interaction types that cue capture processor 1725 may identify includes whether an interaction includes one or more of a search the search engine (e.g., using a browser application), a transmission of an email with or without the reply thereto (e.g., using an email application), a transmission of a telephonic text message with or without the reply thereto (e.g., using text message application, such as for SMS text messages), a transmission of voice data, such as during a telephone call, to a callee telephone number associated with a destination at which a preferential activity may be performed, location data (e.g., GPS coordinates) received during one or more durations of time during which mobile computing device 1750 (e.g., and presumably user 1770) coincide with the location coordinates associated with a location at which an activity may be performed, and a transmission of an electronic message or other electronic interactions to provide data associated with any other interaction or and interaction type.

In some examples, user 1770 may implement a mobile computing device 1750 to log data representative of events at certain geographic locations to generate cues (e.g., predictive cues as described, for example, as generated by cue predictor 254*c* of FIG. 2), whereby data logging may be manually performed or automatically performed under control of executable instructions of application 1752. For example, application 1752 on a mobile computing device (e.g., a mobile phone) may be configured to detect one or more digital images (photos) being captured, each digital photo associated with a location (e.g., GPS coordinates). Upon detecting that a photo is captured, application 1725 may log data representing contemporaneous emails, text messages, phone calls (e.g., initiated and received), music played via a music application, etc. Application 1725 may transmit data via network 1740 to the collaborative recollection engine 150, which may be implemented as a computing device 1710 operative in response to executable instructions stored in repository 1712

To illustrate functionality of cue capture processor 1725 as application 1752, consider user 1770 interacts with an interface 1751*a* of a mobile computing device 1701 to search for activities relating to "golf." As such, cue capture processor 1725 may extract key text terms associated with the search performed at that point in time. But next consider user 1770 causes an email (via interface 1751*d*) to be sent to an entity associated with a destination (e.g., Bluebonnet Hill Golf Course). In some examples, performing an email inquiry may include text that may be extracted for use as cues. Next consider that user 1770 uses interface 1751*e* to make a phone call to an entity associated with golf course 1781. Further to this example, consider that user 1770 visits golf course 1781 as user 1770*a* in region ("R2") 1763, and plays a round of golf (e.g., location coordinates remain relatively coterminous with a boundary of golf course 1781 during a period of time that typically takes to play 9 or 18 holes of golf). GPS coordinates may also be captured and transmitted to collaborative recollection engine 150. Next, user 1770*a* may generate or capture a photo or image during a golf game using interface 1751*f* of mobile computing device 1701. Data captured via mobile computing device 1701 may be transmitted to collaborative recollection engine 150 to form, for example, a tag "golf" as an activity attribute, and to form a cue based on the image taken with a camera. The cue may be presented at some future point in time to promote future remembering and to evoke "anticipatory nostalgia."

Consider another example in which a user interacts with an interface 1751*b* of mobile computing device 1703 (e.g., which may be the same as mobile computing device 1750 at a different point in time). As shown, user 1770 may interact with user interface 1751*b* to perform takes pictures while listening to Beethoven's Für Elise, thereby forming a future cue configured to evoke memories or recollections of the Grand Canyon in region ("R1") 1761 to that particular song, which may be a cue for recollecting an experience at some time in the future. Thus, Für Elise may cause evoke "anticipatory nostalgia." Furthermore, user 1770 may add to a timeline (not shown) a soundtrack for each place that user 1770*c* travels, such as to restaurant 1784 in region ("R4") 1767 or to a beach 1782 in region ("R3") 1765. Thus, at some subsequent point in time, user 1770 may listen to a song of soundtrack later to evoke vivid memories of the places user visited while experiencing the song. In some examples, user 1770*c* may travel with mobile computing device 1796, which may be configured to data log GPS coordinates as shown in user interface 1751*c* of computing device 1705.

In view of the foregoing, application 1752 may be configured to facilitate formation of cues in real-time (or in-situ) in relation to an activity performed at a particular location, whereby the cues may be implemented subsequently to evoke "anticipatory nostalgia." As another example, mobile computing device 1750 of FIG. 17 may enable use of voice dictation via an application disposed on mobile computing device 1750 to perform one or more functionalities described herein, such as collaboratively identifying recollections, and enriching such recollections with information associated with elicited memories (e.g., elicited in response to perceiving a particular cue).

Figure 18:
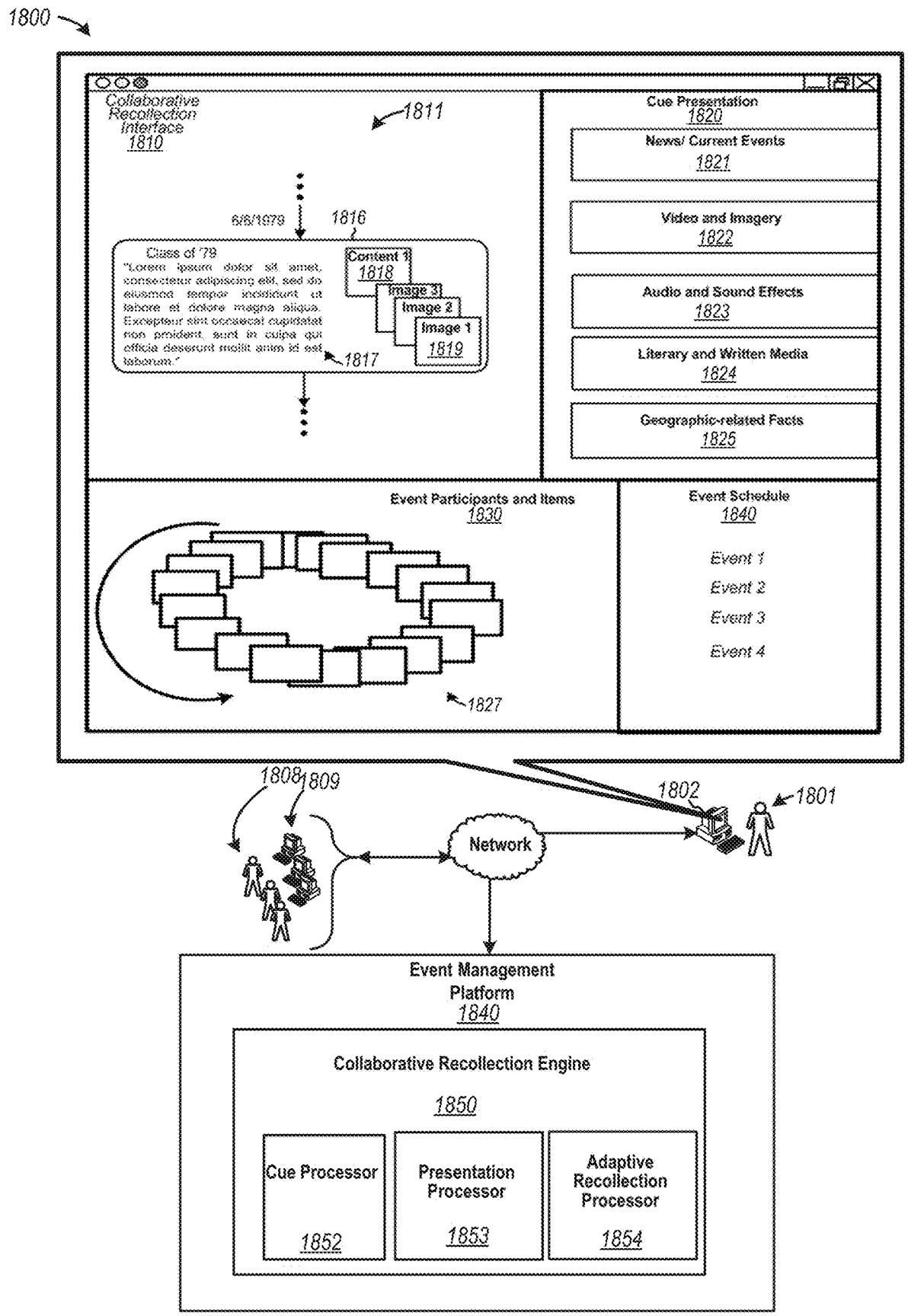
FIG. 18 is a diagram depicting an example of an event management platform implementing a collaborative recollection engine, according to some examples.

FIG. 18 is a diagram depicting an example of an event management platform implementing a collaborative recollection engine, according to some examples. Diagram 1800 includes an event management platform 1840 may be configured to apply one or more functions of a collaborative recollection engine 1850, as described herein, to the management cycle of events, including the creation of events, registration, pricing and payment for events, promotion and marketing, as well as tools for monitoring and reporting on events throughout their life-cycle including post-event activities. Event management platform 1840 may be configured to be implemented independent from, or in conjunction with collaborative recollection engine 1850. Event management platform 1840 includes a collaborative recollection engine 1850, which, in turn, includes a cue processor 1852, a presentation processor 1853, an adaptive recollection processor 1854. One or more elements depicted in diagram 1800 of FIG. 18 may include structures and/or functions as similarly-named or similarly-numbered elements depicted in other drawings, or as otherwise described herein, in accordance with one or more examples.

According to some examples, presentation processor 1853 may generate a collaborative recollection interface 1810 depicting a timeline 1811 (or a portion thereof) depicting an announcement of an event as a recollection 1816, which is shown to include descriptive text 1817, and accompanying images 1819 and content 1818 to facilitate interactions and memory recall.

Event management platform 1840 may be configured to analyze the degrees of connectivity between users, including user 1801, to prioritize the display of other users registered for an event, such as one of the events depicted in event schedule 1840. Event management platform 1840, therefore, may be configured to motivate potential attendees who are more likely to register if they know that friends or other people with shared interests or common bonds and experiences are attending an event. In some examples, collaborative recollection interface 1810 may include a rotating mosaic 1827 of photos of other users who have registered for a particular event in "Event Participants and Items" interface 1830. The display of any particular registrant's photo may be determined by a degree of connectivity to user 1801 viewing the event information. According to some examples, cue presentation interface 1820 includes various cues 1821 to 1825 that may be associated with an event and/or any participants associated (e.g., registered) with the event.

User 1801 can sort and search for other users registered for an event, or attendees of a past event, by criteria captured in a user's profile, as well as based on and memories or recollections and stories stored in collaborative recollection engine 1850. Event management platform 1840 may be configured to present event-related memories or recollections to induce nostalgia for past events so as to increase interest in upcoming events. Rather than selecting an event memory randomly or chronologically, event management platform 1840 may be configured to extract information from a user's profile information, shared interests, and common bonds and shared experiences to prioritize those event memories that are more likely to resonate with a user. Event management platform 1840 may be configured to facilitate searches through events using criteria including location, affiliations, interest, title, who else is going, and date, so that user 1801 may be induced on attending the event.

Target markets for the invention include, but are not limited to, colleges and the military. In planning an event, organizations are often faced with a challenge to maintain complete and accurate records of friends. Many colleges, for example, employ third-parties to find lost or former persons related to a college, but no longer is reachable For example, contact information for alumni may not be available. In some examples, event management platform 1840 may be configured to include a "Help Us Find" feature to solicit users in finding lost friends or person a user affiliated with an organization at least during a common duration of time. Thus, event management platform 1840 may be configured to leverage a web of connectivity to prioritize the display of lost friends according to a probable degree of connectivity to an existing user, thereby increasing a likelihood that the user may have relevant information about a lost friend. Moreover, when an organization successfully contacts a lost friend using this information, it may likely be more desirable to inform a potential attendee that the information came from a friend instead of from a third-party who scoured the public records and other databases, most of which buy or access personal information without regard for users' 1801 privacy. In some examples, event management platform 1840 may be adapted to sell products, such as selling playlists from a time that a user was in an organization, memorabilia from a concert attended, or souvenirs from a place visited by a user. In some examples, an ability to sell products such as playlists, etc., could also apply to the non-event management part of the system (e.g., the timeline).

According to various embodiments, collaborative recollection engine 1850 may be configured to facilitate the transfer of wisdom from one user to another user, such as from a father to a son, whereby the father desires to pass along his experiences, skills, and advice in a certain area, such as finance. In this case, a user may generate recollections, such as recollections 112 and 116 of FIG. 1 that may be directed to textual descriptions relating to a particular topic (rather than general life experiences). For example, a user 1801 via computing device 1802 may implement collaborative recollection engine 1850 as a platform for facilitating retroactive life logging of memorable experiences or advice, such as providing provide financial investing advice or real estate purchasing advice to one's children. Further, user 1801 may configure collaborative recollection engine 1850 to limit access of a subset of recollection (i.e., those related to and identified as financial advice or wisdom) to a select cohort of friends, acquaintances, service professionals (e.g., father's accountant), etc., who may collaborate or assist, as users 1808, in providing advice to the children of user 1801. Thus, user 1801 may avoid having any "financially-challenged" friend pass along questionable financial advice to the children of user 1801, especially once user 1801 can no longer do so (e.g., after user 101 has passed away). In sum, collaborative recollection engine 1850 may be configured to allow users to ask specific users to opine on various subjects or topics (e.g., "what is your investment strategy?," "what advice would you give for buying property?," etc.). User 101 can further determine who of users 1808 is able to interact, including aforementioned voting and commenting mechanisms, as well as who is able to access a question or provide advice as a response.

According to various embodiments, collaborative recollection engine 1850 may be configured to allow users to create groups of friends as a subset of users 1808. Further, collaborative recollection engine 1850 may be configured to suggest different types of groups of friends (e.g., close friends, certain acquaintances or family members, etc.) with which a given user may be associated. These friend groups may assist organizations, such as companies, universities, etc., to identify individual users with which a person may choose to interact.

According to various embodiments, collaborative recollection engine 1850 may be configured to facilitate formation of data representing interrelationships, which may include a "web of connections." Thus, collaborative recollection engine 1850 may allow users to filter and sort through users and information to identify overlaps in backgrounds, interests, and other attributes among multiple users. For example, a user may want to search for friends who played football, are between the ages of 30 and 40, and who work in the financial industry in New York. Thus, continuing with the example, the results of the search may be graphically displayed in a way that as a number of connections increases between a person and another user, the "distance" between user 101 of FIG. 1 and another user 104 of FIG. 1 decreases. For instance, a number of similar or the same user attributes, such as common college, fraternity, sports, travel locations, etc. may determine a relatively high degree of association. Thus, user 101 and 104 may be graphically displayed as being closer together than other users have fewer common or similar overlapping attributes.

Referring back to FIG. 18, collaborative recollection engine 1850 may be configured to recommend other users according to the degree of connectivity, according to some examples. Collaborative recollection engine 1850 may be configured to mine or identify data from users' profile data, such as alma mater, profession, location and so forth, as well as from data representing common interests and experiences, such as memories and stories recorded of certain places and/or events. The relationships between user 1801 and users 1808 can be visually represented as a web of connectivity. User 1801 can select criteria by which he or she wants to determine the degree of connectivity to other users, such as places visited, experiences, interests, professional and/or personal affiliation, and so forth. Thus, the web of connectivity can be utilized in multiple ways. For example, a user seeking a position in a Wall Street bank may search for fellow alumni and fraternity members who also played football in college, graduated ten to twenty years before them, and who are working in the financial industry in New York. By refining and increasing the degree of connectivity with target attributes of a target person, user 1801 may increase the probability of receiving a response to a request for advice, a job interview, professional introductions, and the like. In another example, collaborative recollection engine 1850 may be implemented to facilitate travel planning User 1801 may pull up memories related to, for example, travel in Croatia within the past two years.

Figure 19:
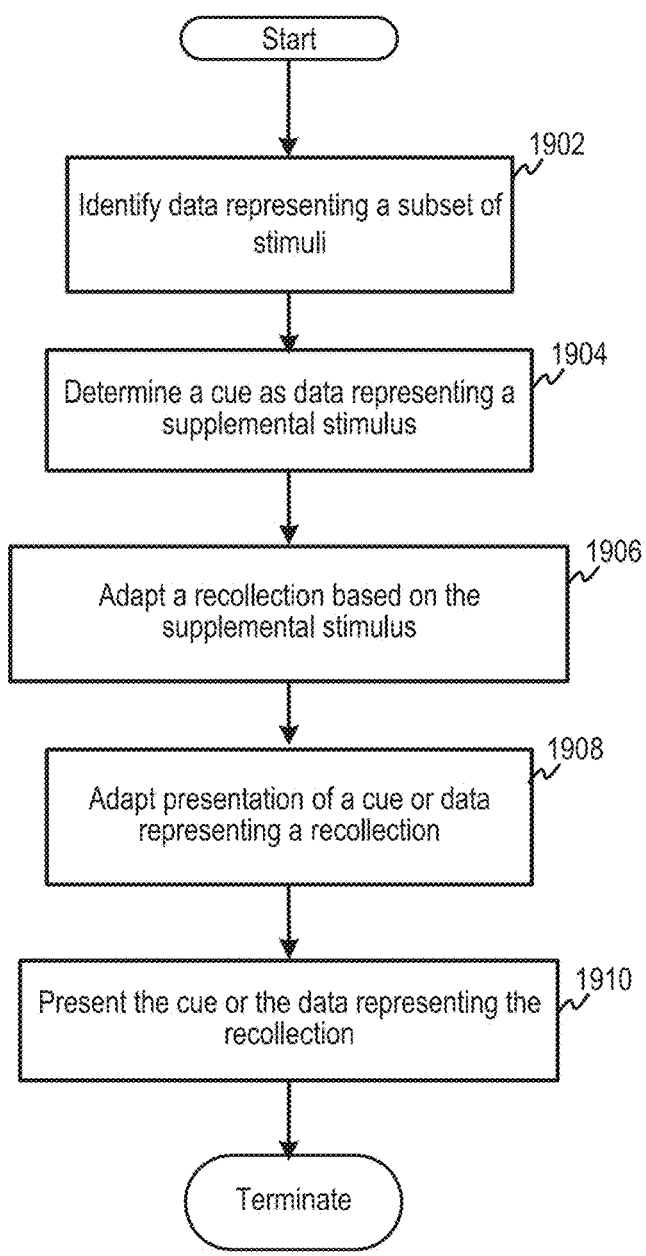
FIG. 19 is a diagram depicting a flow diagram as an example of forming cues for presentation in association with a recollection, according to some embodiments.

FIG. 19 is a diagram depicting a flow diagram as an example of forming cues for presentation in association with a recollection, according to some embodiments. Flow 1900 begins at 1902, which describes that data representing a subset of stimuli is identified. The stimuli may be any perceptible item (e.g., visual item, auditory item, olfactory-related item, etc.) that may serve as a memory cue to assist in eliciting a recalled memory or recollection. At 1904, a cue, as data representing a supplemental stimulus, may be determined. For example, a cue may be presented to a user as a supplemental stimulus to evoke further details of a memory or recollection. As such, the cue may serve as a catalyst to enrich a user's recollection. At 1906, a recollection, whether text and/or image-based, may be adapted based on the supplemental stimulus. In some cases, the supplemental stimulus may be contributions of another user (e.g., a text description of details of a memory). Thus, the supplemental stimulus may be fused or combined with a user's recollection to form a composite recollection. At 1908, the presentation of a cue or data representing a recollection may be adapted. For example, the data representing a recollection may be adapted or tailored to a particular class of reader, such as a student, a juvenile, an adult, etc. At 1910, the cue or the data representing the recollection may be presented to a user so as to evoke additional details or memories (e.g., mind pop memories, flashbulb memories, episodic memories, etc.).

Figure 20:
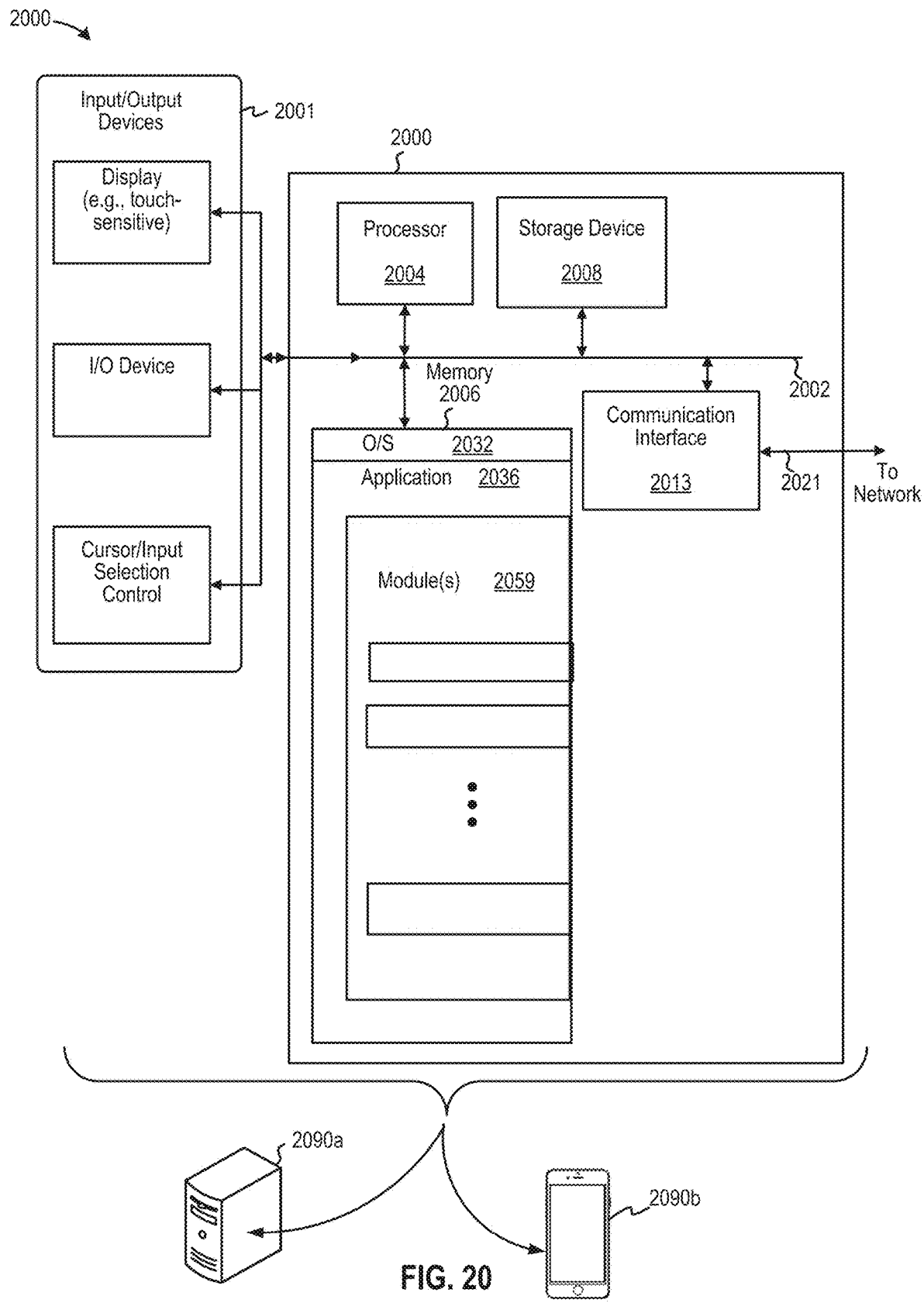
FIG. 20 illustrates examples of various computing platforms configured to provide various functionalities to components of a collaborative recollection engine, according to various embodiments.

FIG. 20 illustrates examples of various computing platforms configured to provide various functionalities to components of a collaborative recollection engine, according to various embodiments. In some examples, computing platform 2000 may be used to implement computer programs, applications, methods, processes, algorithms, or other software, as well as any hardware implementation thereof, to perform the above-described techniques.

In some cases, computing platform 2000 or any portion (e.g., any structural or functional portion) can be disposed in any device, such as a computing device 2090a, mobile computing device 2090b, and/or a processing circuit in forming structures and/or functions of a collaborative recollection engine, according to various examples described herein.

Computing platform 2000 includes a bus 2002 or other communication mechanism for communicating information, which interconnects subsystems and devices, such as processor 2004, system memory 2006 (e.g., RAM, etc.), storage device 2008 (e.g., ROM, etc.), an in-memory cache (which may be implemented in RAM 2006 or other portions of computing platform 2000), a communication interface 2013 (e.g., an Ethernet or wireless controller, a Bluetooth controller, NFC logic, etc.) to facilitate communications via a port on communication link 2021 to communicate, for example, with a computing device, including mobile computing and/or communication devices with processors, including database devices (e.g., storage devices configured to store atomized datasets, including, but not limited to triplestores, etc.). Processor 2004 can be implemented as one or more graphics processing units ("GPUs"), as one or more central processing units ("CPUs"), such as those manufactured by Intel® Corporation, or as one or more virtual processors, as well as any combination of CPUs and virtual processors. Computing platform 2000 exchanges data representing inputs and outputs via input-and-output devices 2001, including, but not limited to, keyboards, mice, audio inputs (e.g., speech-to-text driven devices), user interfaces, displays, monitors, cursors, touch-sensitive displays, LCD or LED displays, and other I/O-related devices.

Note that in some examples, input-and-output devices 2001 may be implemented as, or otherwise substituted with, a user interface in a computing device associated with a user account identifier in accordance with the various examples described herein.

According to some examples, computing platform 2000 performs specific operations by processor 2004 executing one or more sequences of one or more instructions stored in system memory 2006, and computing platform 2000 can be implemented in a client-server arrangement, peer-to-peer arrangement, or as any mobile computing device, including smart phones and the like. Such instructions or data may be read into system memory 2006 from another computer readable medium, such as storage device 2008. In some examples, hard-wired circuitry may be used in place of or in combination with software instructions for implementation. Instructions may be embedded in software or firmware. The term "computer readable medium" refers to any tangible medium that participates in providing instructions to processor 2004 for execution. Such a medium may take many forms, including but not limited to, non-volatile media and volatile media. Non-volatile media includes, for example, optical or magnetic disks and the like. Volatile media includes dynamic memory, such as system memory 2006.

Known forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can access data. Instructions may further be transmitted or received using a transmission medium. The term "transmission medium" may include any tangible or intangible medium that is capable of storing, encoding or carrying instructions for execution by the machine, and includes digital or analog communications signals or other intangible medium to facilitate communication of such instructions. Transmission media includes coaxial cables, copper wire, and fiber optics, including wires that comprise bus 2002 for transmitting a computer data signal.

In some examples, execution of the sequences of instructions may be performed by computing platform 2000. According to some examples, computing platform 2000 can be coupled by communication link 2021 (e.g., a wired network, such as LAN, PSTN, or any wireless network, including WiFi of various standards and protocols, Bluetooth®, NFC, Zig-Bee, etc.) to any other processor to perform the sequence of instructions in coordination with (or asynchronous to) one another. Computing platform 2000 may transmit and receive messages, data, and instructions, including program code (e.g., application code) through communication link 2021 and communication interface 2013. Received program code may be executed by processor 2004 as it is received, and/or stored in memory 2006 or other non-volatile storage for later execution.

In the example shown, system memory 2006 can include various modules that include executable instructions to implement functionalities described herein. System memory 2006 may include an operating system ("O/S") 2032, as well as an application 2036 and/or logic module(s) 2059. In the example shown in FIG. 20, system memory 2006 may include any number of modules 2059, any of which, or one or more portions of which, can be configured to facilitate any one or more components of a computing system (e.g., a client computing system, a server computing system, etc.) by implementing one or more functions described herein.

The structures and/or functions of any of the above-described features can be implemented in software, hardware, firmware, circuitry, or a combination thereof. Note that the structures and constituent elements above, as well as their functionality, may be aggregated with one or more other structures or elements. Alternatively, the elements and their functionality may be subdivided into constituent sub-elements, if any. As software, the above-described techniques may be implemented using various types of programming or formatting languages, frameworks, syntax, applications, protocols, objects, or techniques. As hardware and/or firmware, the above-described techniques may be implemented using various types of programming or integrated circuit design languages, including hardware description languages, such as any register transfer language ("RTL") configured to design field-programmable gate arrays ("FPGAs"), application-specific integrated circuits ("ASICs"), or any other type of integrated circuit. According to some embodiments, the term "module" can refer, for example, to an algorithm or a portion thereof, and/or logic implemented in either hardware circuitry or software, or a combination thereof. These can be varied and are not limited to the examples or descriptions provided.

In some embodiments, modules 2059 of FIG. 20, or one or more of their components, or any process or device described herein, can be in communication (e.g., wired or wirelessly) with a mobile device, such as a mobile phone or computing device, or can be disposed therein.

In some cases, a mobile device, or any networked computing device (not shown) in communication with one or more modules 2059 or one or more of its/their components (or any process or device described herein), can provide at least some of the structures and/or functions of any of the features described herein. As depicted in the above-described figures, the structures and/or functions of any of the above-described features can be implemented in software, hardware, firmware, circuitry, or any combination thereof. Note that the structures and constituent elements above, as well as their functionality, may be aggregated or combined with one or more other structures or elements. Alternatively, the elements and their functionality may be subdivided into constituent sub-elements, if any. As software, at least some of the above-described techniques may be implemented using various types of programming or formatting languages, frameworks, syntax, applications, protocols, objects, or techniques. For example, at least one of the elements depicted in any of the figures can represent one or more algorithms. Or, at least one of the elements can represent a portion of logic including a portion of hardware configured to provide constituent structures and/or functionalities.

For example, modules 2059 or one or more of its/their components, or any process or device described herein, can be implemented in one or more computing devices (i.e., any mobile computing device, such as a wearable device, such as a hat or headband, or mobile phone, whether worn or carried) that include one or more processors configured to execute one or more algorithms in memory. Thus, at least some of the elements in the above-described figures can represent one or more algorithms. Or, at least one of the elements can represent a portion of logic including a portion of hardware configured to provide constituent structures and/or functionalities. These can be varied and are not limited to the examples or descriptions provided.

As hardware and/or firmware, the above-described structures and techniques can be implemented using various types of programming or integrated circuit design languages, including hardware description languages, such as any register transfer language ("RTL") configured to design field-programmable gate arrays ("FPGAs"), application-specific integrated circuits ("ASICs"), multi-chip modules, or any other type of integrated circuit.

For example, modules 2059 or one or more of its/their components, or any process or device described herein, can be implemented in one or more computing devices that include one or more circuits. Thus, at least one of the elements in the above-described figures can represent one or more components of hardware. Or, at least one of the elements can represent a portion of logic including a portion of a circuit configured to provide constituent structures and/or functionalities.

According to some embodiments, the term "circuit" can refer, for example, to any system including a number of components through which current flows to perform one or more functions, the components including discrete and complex components. Examples of discrete components include transistors, resistors, capacitors, inductors, diodes, and the like, and examples of complex components include memory, processors, analog circuits, digital circuits, and the like, including field-programmable gate arrays ("FPGAs"), application-specific integrated circuits ("ASICs"). Therefore, a circuit can include a system of electronic components and logic components (e.g., logic configured to execute instructions, such that a group of executable instructions of an algorithm, for example, and, thus, is a component of a circuit). According to some embodiments, the term "module" can refer, for example, to an algorithm or a portion thereof, and/or logic implemented in either hardware circuitry or software, or a combination thereof (i.e., a module can be implemented as a circuit). In some embodiments, algorithms and/or the memory in which the algorithms are stored are "components" of a circuit. Thus, the term "circuit" can also refer, for example, to a system of components, including algorithms. These can be varied and are not limited to the examples or descriptions provided.

Although the foregoing examples have been described in some detail for purposes of clarity of understanding, the above-described inventive techniques are not limited to the details provided. There are many alternative ways of implementing the above-described invention techniques. The disclosed examples are illustrative and not restrictive.

The invention claimed is:

1. A method to implement a networked computing system as a social network, the method comprising:
   forming a portion of a cue data model configured to associate, for each user identifier, a location, an activity, and an attribute linked together in the cue data model stored in a cue data model repository;
   identifying a subset of stimuli representing one or more of audio, imagery, and text in association with a first user account associated with a first user identifier stored in a data arrangement in association with the cue data model, the first user account associated with a collaborative recollection engine including one or more processors and memory, at least a portion of the stimuli including one of more the text, the audio, or the imagery defining an event, the data being stored or linked to the cue data model repository;
   receiving, from an application executing on a mobile device, a captured digital image and associated geographic location;
   performing extraction from the captured digital image and the associated geographic location to identify either one or more units of image content or the text, or both;
   executing, at a processor, instructions stored in the memory to provide an image processing means configured to implement one or more image recognition processing algorithms stored in the memory to identify the one or more units of image content of the captured digital image as at least one of the one or more units of image content or the text;
   identifying automatically one or more image-derived tags based on the one or more units of image content including the captured digital image as at least one of the one or more units of image content or the text;
   storing the one or more image-derived tags as a subset of image-related cue attributes in the cue data model;
   executing, at the processor, instructions stored in the memory to provide a means configured to implement an algorithm to apply statistical analysis or machine-learning applications to predict a cue to present at a user interface to form a predicted cue, wherein predicting the predicted cue is based on a correlation factor value determined probabilistically based on a frequency of an attribute value, the correlation factor associated with the portion of the cue data model storing one of a subset of cue attributes including the subset of image-related cue attributes in the cue data model, whereby the statistical analysis or machine-learning applications are configured to apply the correlation factor value as a weighting factor to modify a degree of relevancy of the attribute value associated with the cue data to form the predicted cue;
   selecting another user identifier using the degree of relevancy expressed as a relevancy value;
   determining the cue as a supplemental stimulus based on an image-related cue attribute or the geographic location;
   adapting a recollection based on the supplemental stimulus;
   identifying the access privileges for the another user identifier to limit onward sharing or propagation of the recollection or portions thereof to the another user identifier;
   storing a cryptographic hash value associated with the another user identifier in a blockchain;
   adapting presentation of the predicted cue or the recollection to form an adapted presentation, the adapted presentation being based on the access privileges for the another user identifier using the cryptographic hash value stored in the blockchain; and
   transmitting, by the collaborative recollection engine, to the user interface associated with the another user identifier, data configured to present the adapted presentation of the predicted cue or the recollection or portions thereof as visible perceptible depiction of information including either imagery or text, or both at the user interface including causing display a first user interface portion structured to present a collaborative recollection interface, at least a portion of which is generated responsive to data entry associated with a second user interface portion to implement one or more attributes to create the recollection, and further causing display a third user interface portion structured to present one or more predicted cues including the predicted cue, and at least one of the first user interface portion, the second user interface portion, and the third user interface portion being configured to receive data to modify the portion of the cue data model in the cue data model repository.

2. The method of claim 1 wherein identifying the visually perceptible depiction of either the imagery or the text, or both further comprises:
   forming another cue based on either the imagery or text, or both;
   receiving data configured to form the recollection associated with the event at a point in time; and incorporating the another cue as a constituent element of the recollection.

3. The method of claim 2 further comprising:
receiving a request to grant access for a write operation to the recollection to a subset of user accounts;
receiving a modification to the recollection from a computing device associated with a user from the subset of user accounts; and
causing modification to the recollection to form a collaborative recollection.

4. The method of claim 1 further comprises:
accessing the cue data model to analyze a unit of content to identify cue attributes, the unit of content including at least one of the one or more of the units of image content or any other unit of content.

5. The method of claim 1 further comprising:
detecting the cue attribute as one or more of a user identifier, a location, and an activity; and
storing one or more of the user identifier, the location, and the activity in the portion of the cue data model.

6. The method of claim 1 wherein adapting the recollection comprises:
generating multiple versions of the recollection.

7. The method of claim 6 wherein generating the multiple versions of the recollection comprises:
identifying subsets of the access privileges associated with different subsets of other users to access the recollection; and
generating a different version of the recollection for each subset of access privileges.

8. The method of claim 6 wherein generating the multiple versions of the recollection comprises:
identifying one or more portions of the recollection as a function of the access privileges for authorization to access the one or more portions;
redacting one or more other portions of the recollections; and
presenting the one or more portions as a redacted version.

9. An apparatus to implement a networked computing system as a social network, the apparatus comprising:
a memory including executable instructions; and
a processor, responsive to executing the instructions, is configured to:
form portion of a cue data model configured to associate, for each user identifier, a location, an activity, and an attribute linked together in the cue data model stored in a cue data model repository;
identify a subset of stimuli representing one or more of audio, imagery, and text in association with a first user account associated with a first user identifier stored in a data arrangement in association with the cue data model, the first user account associated with a collaborative recollection engine, at least a portion of the stimuli including one of more the text, the audio, or the imagery defining an event, the data being stored or linked to the cue data model repository;
receive, from an application executing on a mobile device, a captured digital image and associated geographic location;
perform extraction from the captured digital image and the associated geographic location to identify either one or more units of image content or the text, or both;
execute, at the processor, instructions stored in the memory to provide an image processing means configured to implement one or more image recognition processing algorithms stored in the memory to identify the one or more units of image content of the captured digital image as at least one of the one or more units of image content or the text;
identify automatically one or more image-derived tags based on the one or more units of image content including the captured digital image as at least one of the one or more units of image content or the text;
store the one or more image-derived tags as a subset of image-related cue attributes in the cue data model;
implement an algorithm to apply statistical analysis or machine-learning applications to predict a cue to present at a user interface to form a predicted cue, wherein the predicted cue is based on a correlation factor value determined probabilistically based on a frequency of an attribute value, the correlation factor associated with the portion of the cue data model storing one of a subset of cue attributes including the subset of image-related cue attributes in the cue data model, whereby the statistical analysis or machine-learning applications are configured to apply the correlation factor value as a weighting factor to modify a degree of relevancy of the attribute value associated with the cue data to form the predicted cue;
select another user identifier using the degree of relevancy expressed as a relevancy value;
determine the cue as a supplemental stimulus based on an image-related cue attribute or the geographic location;
adapt a recollection based on the supplemental stimulus;
identify the access privileges for the another user identifier to limit onward sharing or propagation of the recollection or portions thereof to the another user identifier;
store a cryptographic hash value associated with the another user identifier in a blockchain;
adapt presentation of the predicted cue or the recollection to form an adapted presentation the adapted presentation being based on the access privileges for the another user identifier using the cryptographic hash value stored in the blockchain; and
transmit, using the collaborative recollection engine, to the user interface associated with the another user identifier data configured to present the adapted presentation of the predicted cue or the recollection or portions thereof as visible perceptible depiction of either imagery or text, or both at the user interface, which includes causing display a first user interface portion structured to present a collaborative recollection interface, at least a portion of which is generated responsive to data entry associated with a second user interface portion to implement one or more attributes to create the recollection, and further causing display a third user interface portion structured to present one or more predicted cues including the predicted cue, and at least one of the first user interface portion, the second user interface portion, and the third user interface portion being configured to receive data to modify the portion of the cue data model in the cue data model repository.

10. The apparatus of claim 9 wherein a subset of the instructions further causes the processor to:
identify visually perceptible depiction of either the imagery or the text, or both as the subset of the stimuli.

11. The apparatus of claim 10 wherein a subset of the instructions further causes the processor to:
   form another cue based on either the imagery or text, or both;
   receive data configured to form the recollection associated with the event at a point in time; and
   incorporate the another cue as a constituent element of the recollection.

12. The apparatus of claim 11 wherein a subset of the instructions further causes the processor to:
   receive a request to grant access for a write operation to the recollection to a subset of user accounts,
   receive a modification to the recollection from a computing device associated with a user from the subset of user accounts; and
   cause modification to the recollection to form a collaborative recollection.

13. The apparatus of claim 9 wherein a subset of the instructions further causes the processor to:
   analyze a unit of content to identify cue attributes, the unit of content including at least one of the one or more of the units of image content or any other unit of content.

14. The apparatus of claim 9 wherein a subset of the instructions further causes the processor to:
   generate multiple versions of the recollection.

15. The apparatus of claim 10 wherein a subset of the instructions further causes the processor to:
   identify subsets of the access privileges associated with different subsets of other users to access the recollection; and
   generate a different version of the recollection for each subset of access privileges.

16. The apparatus of claim 10 wherein a subset of the instructions further causes the processor to:
   identify one or more portions of the recollection as a function of the access privileges for authorization to access the one or more portions;
   redact one or more other portions of the recollections; and
   present the one or more portions as a redacted version.

* * * * *